(12) United States Patent
Hamada et al.

(10) Patent No.: US 11,491,978 B2
(45) Date of Patent: Nov. 8, 2022

(54) DRIVING ASSISTANCE DEVICE AND METHOD THAT JUDGE A TARGET OBJECT BASED ON NEIGHBORING OBJECTS

(71) Applicant: Mitsubishi Electric Corporation, Tokyo (JP)

(72) Inventors: Yuji Hamada, Tokyo (JP); Yoshiaki Adachi, Tokyo (JP); Takayoshi Takehara, Tokyo (JP); Takashi Maeda, Tokyo (JP); Masahiko Ikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 175 days.

(21) Appl. No.: 16/980,865

(22) PCT Filed: May 17, 2018

(86) PCT No.: PCT/JP2018/019118
§ 371 (c)(1),
(2) Date: Sep. 15, 2020

(87) PCT Pub. No.: WO2019/220590
PCT Pub. Date: Nov. 21, 2019

(65) Prior Publication Data
US 2021/0009120 A1   Jan. 14, 2021

(51) Int. Cl.
*B60W 30/095* (2012.01)
*G06K 9/62* (2022.01)
(Continued)

(52) U.S. Cl.
CPC ....... *B60W 30/0956* (2013.01); *G06K 9/6218* (2013.01); *G06V 20/58* (2022.01);
(Continued)

(58) Field of Classification Search
CPC ......... B60W 30/0956; B60W 2556/10; B60W 2554/80; G06V 20/58; G06V 20/588; G06K 9/6218
See application file for complete search history.

(56) References Cited

U.S. PATENT DOCUMENTS

2013/0253815 A1* 9/2013 Orfila ................ B60W 30/0953
701/301
2015/0025789 A1* 1/2015 Einecke .................. G01S 13/72
701/408
(Continued)

FOREIGN PATENT DOCUMENTS

DE 102016118497 A1 * 3/2018
JP 2015-032260 A    2/2015
(Continued)

OTHER PUBLICATIONS

International Search Report and Written Opinion dated Jul. 31, 2018 for PCT/JP2018/019118 filed on May 17, 2018, 6 pages including English Translation of the International Search Report.

*Primary Examiner* — Peter D Nolan
*Assistant Examiner* — Kenneth M Dunne
(74) *Attorney, Agent, or Firm* — Xsensus LLP

(57) ABSTRACT

A driving assistance device to properly recognize a relative positional relationship between mobile objects without the use of map information. The driving assistance device includes a relative position judgment section for judging a relative positional relationship of an object of interest and a first neighboring object relative to a second neighboring object, based on object-of-interest information and neighbor information, to make a judgment as a first judgment on a relative positional relationship between the object of interest and the first neighboring object, based on the aforementioned judgment result.

12 Claims, 20 Drawing Sheets

(51) Int. Cl.
*G06V 20/58* (2022.01)
*G06V 20/56* (2022.01)

(52) U.S. Cl.
CPC ....... *G06V 20/588* (2022.01); *B60W 2554/80* (2020.02); *B60W 2556/10* (2020.02)

(56) References Cited

U.S. PATENT DOCUMENTS

| | | | |
|---|---|---|---|
| 2016/0155329 A1 | 6/2016 | Goto et al. | |
| 2018/0194280 A1* | 7/2018 | Shibata | G01C 21/3484 |
| 2019/0322275 A1* | 10/2019 | Ondruska | G06V 20/20 |
| 2020/0312148 A1* | 10/2020 | Hamada | G01S 19/48 |

FOREIGN PATENT DOCUMENTS

| | | |
|---|---|---|
| JP | 2016-110218 A | 6/2016 |
| JP | 2017-096869 A | 6/2017 |
| JP | 2017-146724 A | 8/2017 |
| WO | 2015/151192 A1 | 10/2015 |
| WO | 2018/216058 A1 | 11/2018 |

* cited by examiner

F I G. 9

| CONDITIONS OF USE |||
|---|---|---|
| ROAD RELATIONSHIP | OVERLAP BETWEEN TRAVELING HISTORIES | RELATIVE DISTANCE |
| SAME ROAD | ABSENT | NOT GREATER THAN UPPER LIMIT IN RELATIVE AREAS |
| OPPOSITE ROADS | ABSENT | NOT LESS THAN THRESHOLD VALUE |
| INTERSECTING ROADS | ABSENT | NOT LESS THAN THRESHOLD VALUE |
| OTHER ROADS | ABSENT | NOT LESS THAN THRESHOLD VALUE |

F I G. 10

| ROAD RELATIONSHIP | SELECTION CONDITIONS (ORDER OF PRIORITY) |
|---|---|
| SAME ROAD | (1) OVERLAP BETWEEN TRAVELING HISTORIES<br>(2) POSITIONAL ACCURACY<br>(3) OVERLAP REGION<br>(4) SIDE-BY-SIDE TRAVEL TIME |
| OPPOSITE ROADS<br>INTERSECTING ROADS<br>REGIONS OTHER THAN ABOVE | (1) TRAVELING AREA<br>(2) NON-OVERLAP REGION<br>(3) POSITIONAL ACCURACY |

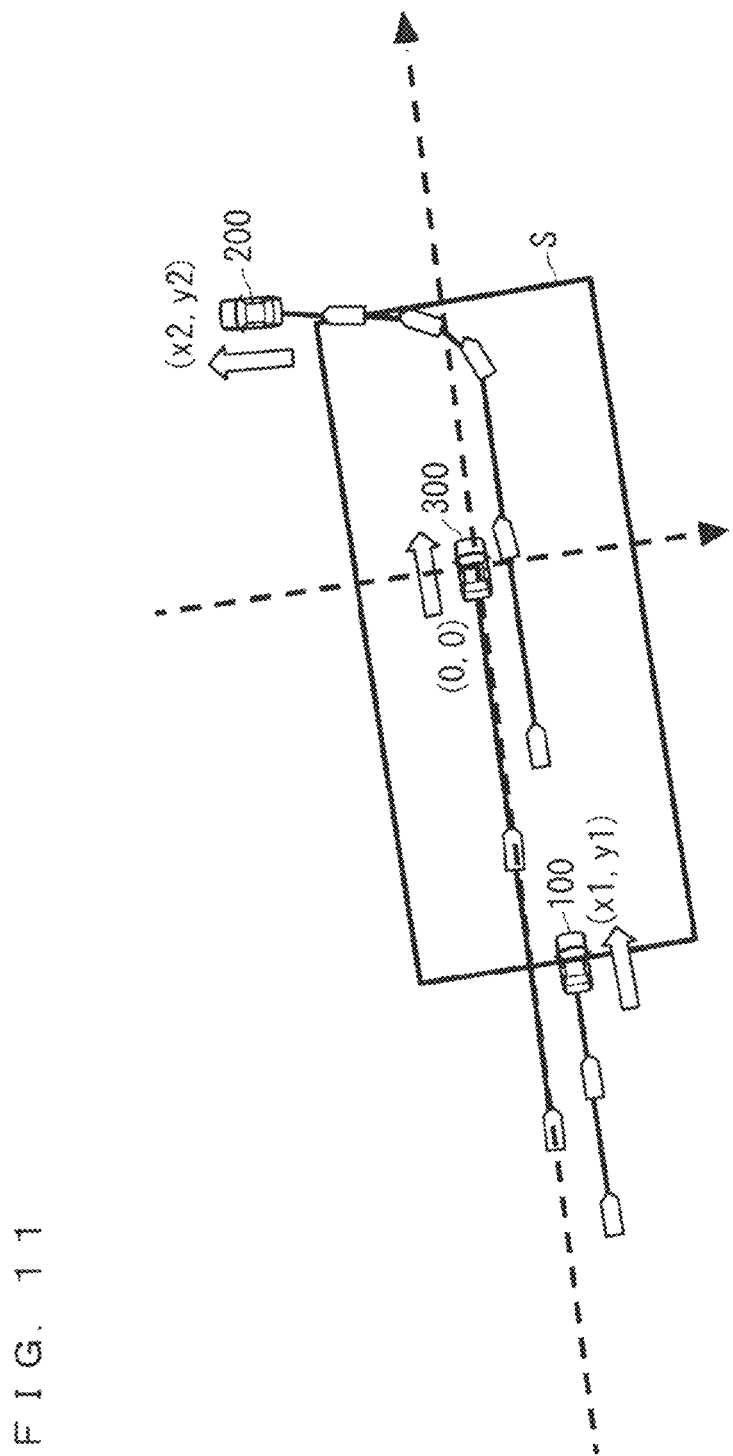

FIG. 15

| POS_HV \ POS_RV | Ahead | Ahead Left | Ahead Right | Behind | Behind Left | Behind Right |
|---|---|---|---|---|---|---|
| Ahead | Ahead | D1>D2:Ahead Left<br>D1<D2:Behind Left | D1>D2:Ahead Right<br>D1<D2:Behind Right | Behind | Behind Left | Behind Right |
| Ahead Left | D1>D2:Ahead Right<br>D1<D2:Behind Right | D1>D2:Ahead<br>D1<D2:Behind | Other | Behind | Behind | Behind Right |
| Ahead Right | D1>D2:Ahead Left<br>D1<D2:Behind Left | Other | D1>D2:Ahead<br>D1<D2:Behind | Behind Right | Behind | Other |
| Behind | Ahead | Ahead Left | Ahead Right | Ahead | Behind Left | Behind |
| Behind Left | Ahead Right | Ahead | Other | D1>D2:Behind Right<br>D1<D2:Ahead Right | D1>D2:Behind<br>D1<D2:Ahead | Other |
| Behind Right | Ahead Left | Other | Ahead | D1>D2:Behind Left<br>D1<D2:Ahead Left | Other | D1>D2:Behind<br>D1<D2:Ahead |

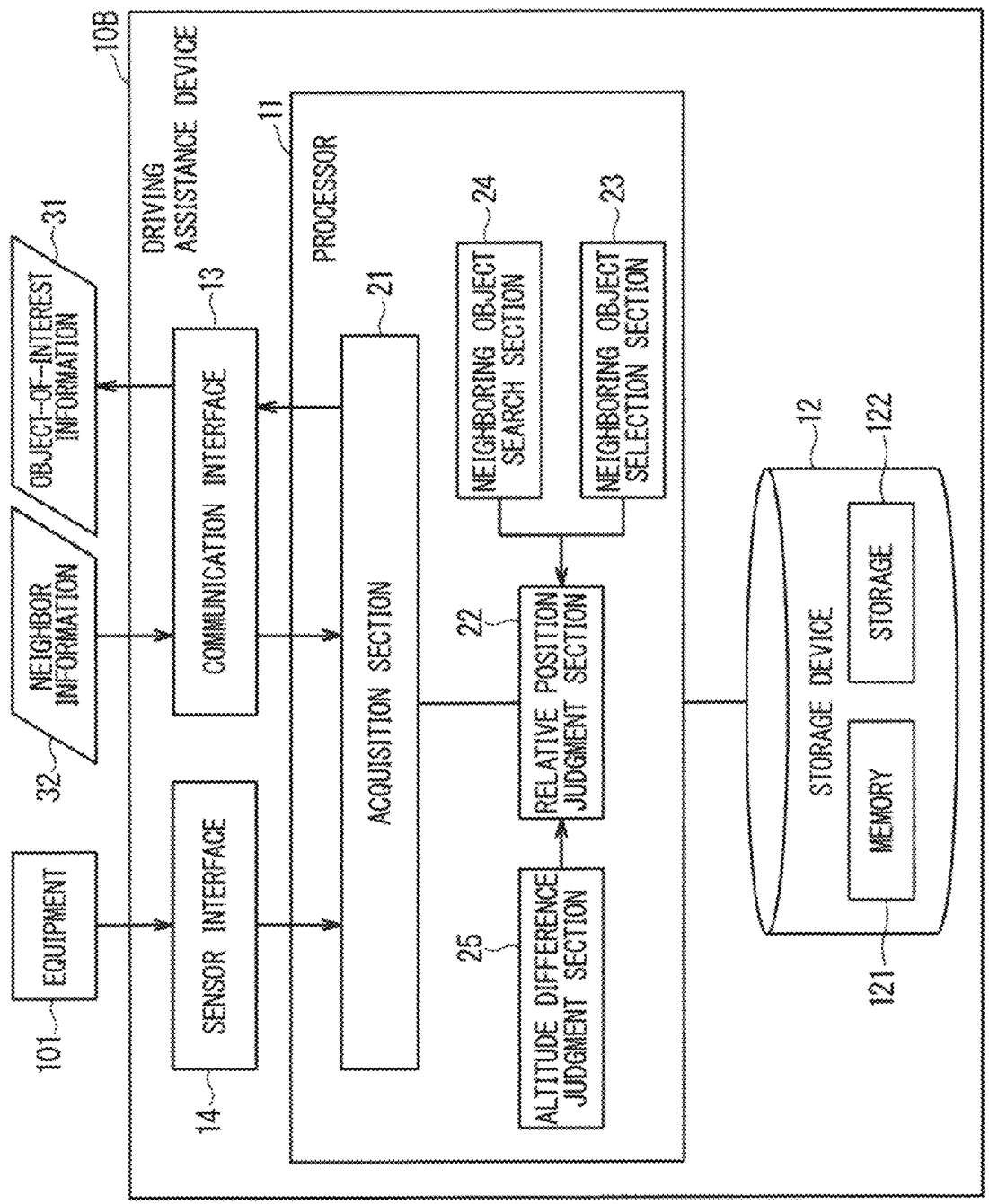

F I G. 2 2

| RELATIVE AREAS OF SECOND NEIGHBORING OBJECT | NUMBER OF LANES | NO LEFT TURN FLAG | NO RIGHT TURN FLAG |
|---|---|---|---|
| Right (Ahead/Behind) | TWO OR MORE | — | △ |
| Far Right (Ahead/Behind) | THREE OR MORE | — | ○ |
| Left (Ahead/Behind) | TWO OR MORE | △ | — |
| Far Left (Ahead/Behind) | THREE OR MORE | ○ | — |
| Right (Ahead/Behind) & Left (Ahead/Behind) | THREE OR MORE | △ | △ |
| Far Right (Ahead/Behind) & Left (Ahead/Behind) | FOUR OR MORE | △ | ○ |
| Right (Ahead/Behind) & Far Left (Ahead/Behind) | FOUR OR MORE | ○ | △ |
| Far Right (Ahead/Behind) & Far Left (Ahead/Behind) | FIVE OR MORE | ○ | ○ |

DRIVING ASSISTANCE DEVICE AND METHOD THAT JUDGE A TARGET OBJECT BASED ON NEIGHBORING OBJECTS

CROSS-REFERENCE TO RELATED APPLICATION

The present application is based on PCT filing PCT/JP2018/019118, filed May 17, 2018, the entire contents of which are incorporated herein by reference.

TECHNICAL FIELD

The present invention relates to a technique for judging a relative positional relationship between mobile objects.

BACKGROUND ART

There has been developed a driving assistance system which uses a vehicle-mounted communication device that sends and receives vehicle information including positional information about a vehicle and the like via wireless communications at periodic intervals. The driving assistance system judges whether there is a risk of collision or not based on the sent and received vehicle information to provide information to a driver or to control the vehicle.

The positional information about the vehicle indicated by the vehicle information is acquired using a positioning satellite such as a GNSS (Global Navigation Satellite System). However, the positional information acquired using the positioning satellite includes errors resulting from delays of signals in the ionosphere, multipath propagation caused by buildings and the like, and system delays. There is a likelihood that the driving assistance system cannot correctly judge the risk of collision under the influence of such errors. Also, the use of maps in a car navigation device is contemplated. In such a case, there arises another problem that processing delays are increased or the costs of the driving assistance system are increased. For this reason, there is a need for a driving assistance system that uses no maps. However, if no maps are used, it is impossible to estimate the relative position with consideration given to the shapes of roads.

Patent Document 1 discloses a technique which uses the traveling history of a neighboring vehicle traveling ahead of a user's vehicle to evaluate whether map information possessed by the user's vehicle correctly represents actual road shapes or not.

Patent Document 2 discloses a technique of storing information received from a neighboring vehicle at a location traveled in the past is stored without the use of map information to judge whether the location is a grade-separated intersection or not when the same location is traveled again.

PRIOR ART DOCUMENTS

Patent Documents

Patent Document 1: Japanese Patent Application Laid-Open No. 2017-146724
Patent Document 2: Japanese Patent Application Laid-Open No. 2016-110218

SUMMARY

Problem to be Solved by the Invention

In the technique disclosed in Patent Document 1, the correctness of the map information is evaluated from the traveling history of the preceding vehicle. However, this technique judges that the preceding vehicle is present ahead of the user's vehicle through the use of the map information. For this reason, there is a likelihood that the position of the neighboring vehicle cannot be judged correctly in a system configuration that has no map information.

In Patent Document 2, the information received from a neighboring vehicle when a location is traveled in the past is stored, and whether the location is a grade-separated intersection or not is judged. Information about all of the roads on which a vehicle of interest has traveled in the past is stored. This requires enormous amounts of information to be stored. Accordingly, there is a likelihood that the same throughput and costs as when map information is internally generated are required.

In view of the foregoing, it is therefore an object of the present invention to properly recognize a relative positional relationship between mobile objects without the use of map information.

Means to Solve the Problem

According to the present invention, a driving assistance device includes an acquisition section for acquiring object-of-interest information indicating a traveling history of an object of interest that is a mobile object, and neighbor information indicating a traveling history of a neighboring object that is a mobile object traveling around the object of interest. The neighboring object includes a first neighboring object that is a mobile object for judgment of a relative positional relationship relative to the object of interest by means of the driving assistance device, and at least one second neighboring object the traveling history of which partially overlaps the traveling history of at least one of the object of interest and the first neighboring object. The driving assistance device further includes a relative position judgment section for judging a relative positional relationship of the object of interest and the first neighboring object relative to the second neighboring object, based on the object-of-interest information and the neighbor information, to make a judgment as a first judgment on a relative positional relationship between the object of interest and the first neighboring object, based on the aforementioned judgment result.

Effects of the Invention

The driving assistance device according to the present invention uses the neighbor information about the second neighboring object to judge the relative positional relationship between the object of interest and the first neighboring object. Thus, the driving assistance device is capable of properly recognizing the relative positional relationship between the mobile objects without the use of map information. These and other objects, features, aspects and advantages of the present invention will become more apparent from the following detailed description of the present invention when taken in conjunction with the accompanying drawings.

BRIEF DESCRIPTION OF DRAWINGS

FIG. 9 is a table showing conditions of use of neighbor information about the second neighboring objects.

FIG. 10 is a table showing conditions of selection of the second neighboring objects.

FIG. 11 is a view showing a coordinate system with a second neighboring object taken as an origin point.

FIG. 15 is a table showing a method of calculating the relative areas of the first neighboring object with the object of interest taken as a starting point.

FIG. 16 is a diagram of the driving assistance device according to a second embodiment.

FIG. 22 is a table showing the number of lanes in the traveling road and results of judgment of the likelihood of right and left turns.

DESCRIPTION OF EMBODIMENT(S)

A. First Embodiment

A-1. Configuration

Figure 1:
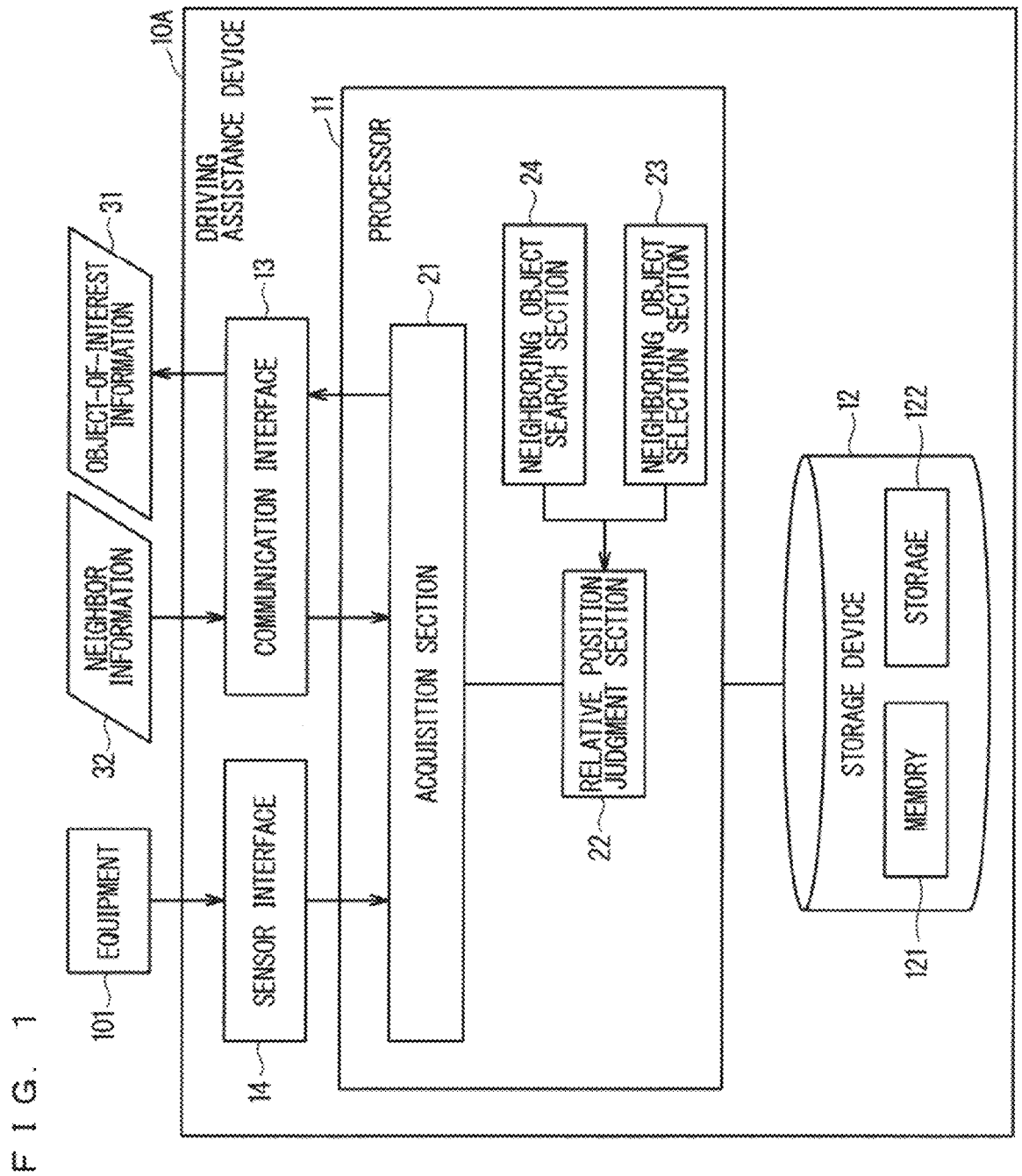
FIG. 1 is a diagram of a driving assistance device according to a first embodiment.

A configuration of a driving assistance device 10A according to a first embodiment will be described with reference to FIG. 1. The driving assistance device 10A is a computer mounted on an object of interest 100 that is a mobile object such as a vehicle. In the first embodiment, the object of interest 100 is a vehicle. The driving assistance device 10A may be mounted integrally with or inseparably from the object of interest 100 or other components shown. Alternatively, the driving assistance device 10A may be mounted removably or separably from the object of interest 100 or other components shown.

The driving assistance device 10A includes a processor 11, a storage device 12, a communication interface 13, and a sensor interface 14 as hardware components. The processor 11 is connected to the other hardware components through signal lines, and controls these hardware components.

The processor 11 is an IC (Integrated Circuit) for executing instructions described in programs to execute processes including data transfer, calculation, processing, control, management, and the like. The processor 11 includes an arithmetic circuit, and a register and a cache memory in which instructions and information are stored. Specifically, the processor 11 is a CPU (Central Processing Unit), a DSP (Digital Signal Processor), or a GPU (Graphics Processing Unit).

The storage device 12 includes a memory 121 and a storage 122. Specifically, the memory 121 is a RAM (Random Access Memory). Specifically, the storage 122 is a HDD (Hard Disk Drive). Alternatively, the storage 122 may be a portable storage medium such as a SD (Secure Digital®), a memory card, a CF (CompactFlash), a NAND flash, a flexible disk, an optical disk, a compact disk, a Blu-ray® disk, and a DVD.

The communication interface 13 is a device including a receiver for receiving data and a transmitter for transmitting data. Specifically, the communication interface 13 is a communication chip or a NIC (Network Interface Card). The communication interface 13 uses a communications protocol such as a DSRC (Dedicated Short Range Communication) dedicated to vehicle communication or IEEE802.11p. Also, the communication interface 13 may use a mobile telephone network such as LTE(Long Term Evolution®) or 4G. Also, the communication interface 13 may use Bluetooth® or a wireless LAN such as IEEE802.11a/b/g/n.

The sensor interface 14 is a device for connecting the processor 11 to equipment 101. The equipment 101 includes a vehicle-mounted ECU (Electronic Control Unit), a speed sensor, an acceleration sensor, an orientation sensor, and an EPS (Electric Power Steering). Specifically, the sensor interface 14 is a sensor ECU.

The driving assistance device 10A includes an acquisition section 21, a relative position judgment section 22, a neighboring object selection section 23, and a neighboring object search section 24 as functional components. The functions of the functional components are implemented by software.

Programs for implementing the functions of the functional components of the driving assistance device 10A are stored in the storage 122 of the storage device 12. These programs are read into the memory 121 by the processor 11, and are executed by the processor 11. Thus, the functions of the sections of the driving assistance device 10A are implemented.

Information, data, signal values, and variable values which represent the results of processing in the functional components implemented by the processor 11 are stored in the memory 121 or in the register or the cache memory in the processor 11. In the following description, it is assumed that information, data, signal values, and variable values which represent the results of processing in the functional components implemented by the processor 11 are stored in the memory 121.

The single processor 11 only is shown in FIG. 1. However, a plurality of processors 11 may be provided. The plurality of processors 11 may execute the programs implementing the functions in a coordinated fashion.

A-2. Operation

An operation of the driving assistance device 10A according to the first embodiment will be described with reference to FIGS. 2 to 11. The operation of the driving assistance device 10A according to the first embodiment corresponds to a driving assistance method according to the first embodiment.

Figure 2:
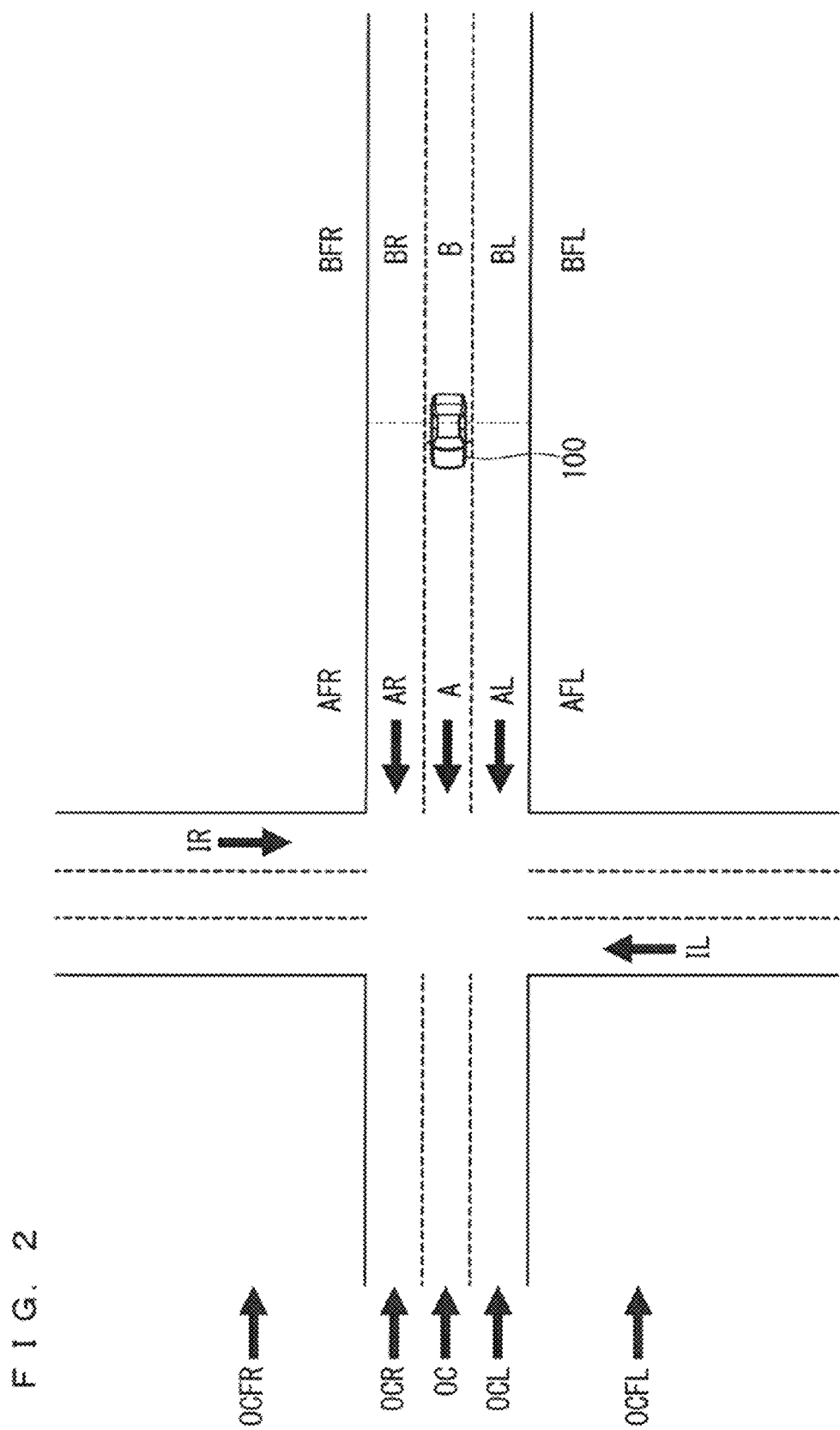
FIG. 2 is a view showing relative areas.

Relative areas 40 according to the first embodiment will be described with reference to FIG. 2. The relative areas 40 are areas into which a surrounding area of the object of interest 100 that is a mobile object with the driving assistance device 10A mounted thereon is divided. The surrounding area of the object of interest 100 is an area within 300 m from the object of interest 100, for example. In the example of FIG. 2, the relative areas 40 are defined as an area A (Ahead), an area AL (Ahead Left), an area AR (Ahead Right), an area AFL (Ahead Far Left), an area AFR (Ahead Far Right), an area B (Behind), an area BL (Behind Left), an area BR (Behind Right), an area BFL (Behind Far Left), an area BFR (Behind Far Right), an area IL (Intersecting Left), and an area IR (Intersecting Right). It should be noted that the relative areas 40 may be defined by other methods in which the surrounding area of the object of interest 100 is divided into smaller areas.

The area A is a front area of the lane in which the object of interest 100 is present. The area AL is a front area of the lane located immediately to the left of the object of interest 100. The area AR is a front area of the lane located immediately to the right of the object of interest 100. The area AFL is a front area of a lane located at least two to the left of the object of interest 100. The area AFR is a front area of a lane located at least two to the right of the object of interest 100.

The area B is a rear area of the same lane as the object of interest 100. The area BL is a rear area of the lane located immediately to the left of the object of interest 100. The area BR is a rear area of the lane located immediately to the right of the object of interest 100. The area BFL is a rear area of a lane located at least two to the left of the object of interest 100. The area BFR is a rear area of a lane located at least two to the right of the object of interest 100.

The area IL is an area of a road after a left turn at an intersection ahead of the object of interest 100. The area IR is an area of a road after a right turn at an intersection ahead of the object of interest 100.

There is a likelihood that it is difficult to make a distinction between the area IL and the area AFL and a distinction between the area IR and the area AFR based on only the relative positions. In this case, the driving assistance device 10A may identify the direction of movement of a first neighboring object 200 based on a change in position of the first neighboring object 200 for a past reference period to make the distinction between the area IL and the area AFL and the distinction between the area IR and the area AFR based on the identified direction of movement.

As shown in FIG. 2, areas present ahead of the object of interest 100 as the relative areas 40 in which a neighboring object opposite in direction from the object of interest 100 is present may be defined as an area OC (OnComing), an area OCR (OnComing Right), an area OCL (OnComing Left), an area OCFR (OnComing FarRight), and an area OCFL (OnComing FarLeft).

Figure 3:
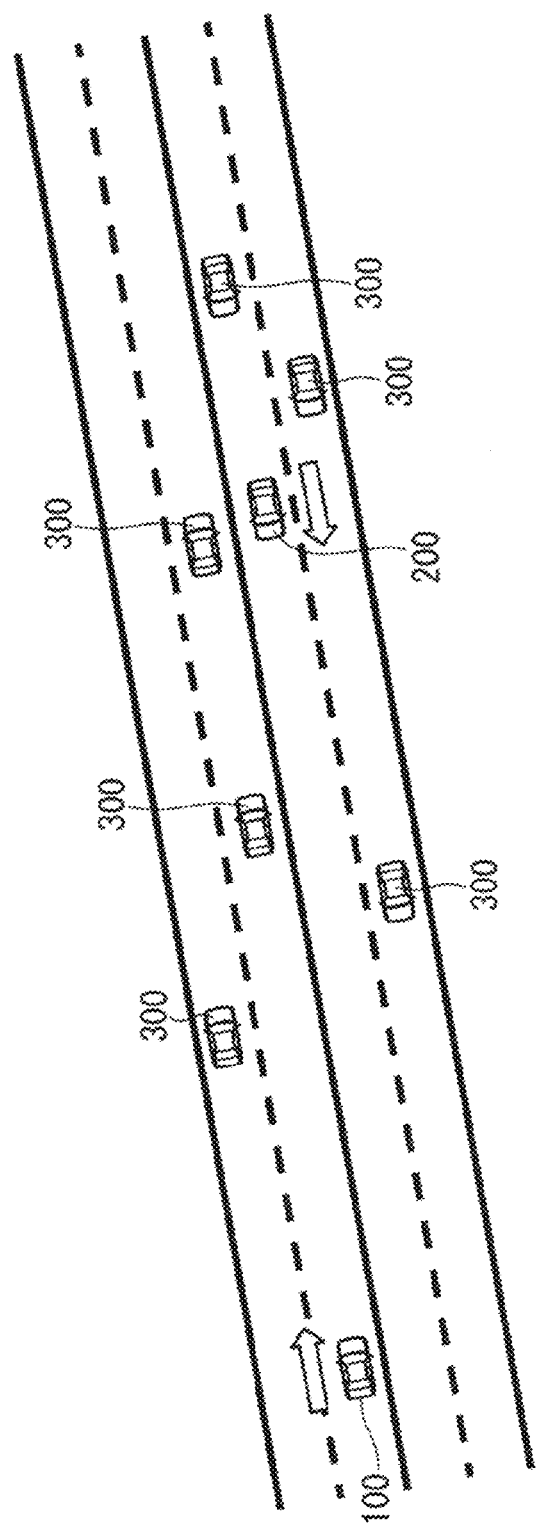
FIG. 3 is a view showing an object of interest, a first neighboring object, and second neighboring objects.

The object of interest 100, the first neighboring object 200, and at least one second neighboring object 300 according to the first embodiment will be described with reference to FIG. 3. The object of interest 100 is a mobile object serving as a reference. The first neighboring object 200 is a mobile object for judgment of the position relative to the object of interest 100. The at least one second neighboring object 300 is a third party different from the object of interest 100 and the first neighboring object 200. The at least one second neighboring object 300 may include a plurality of second neighboring objects 300.

Figure 4:
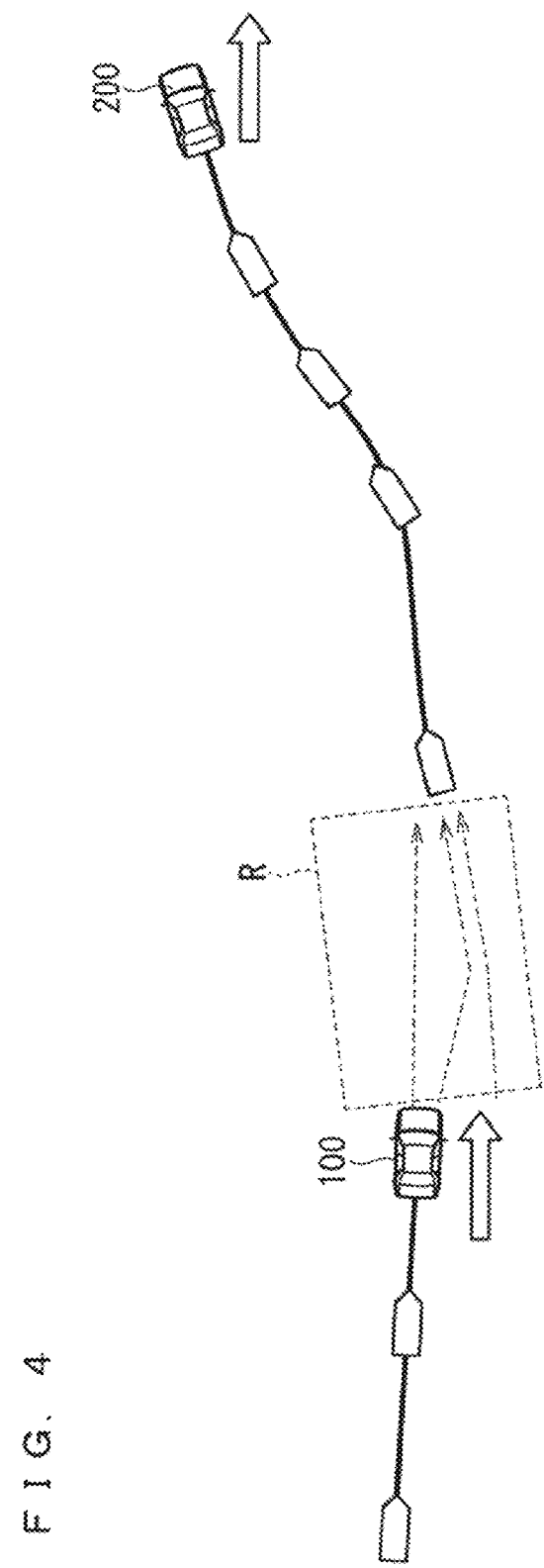
FIG. 4 is a view showing an instance in which the object of interest and the first neighboring object travel in the same direction and the traveling histories thereof do not overlap.
Figure 5:
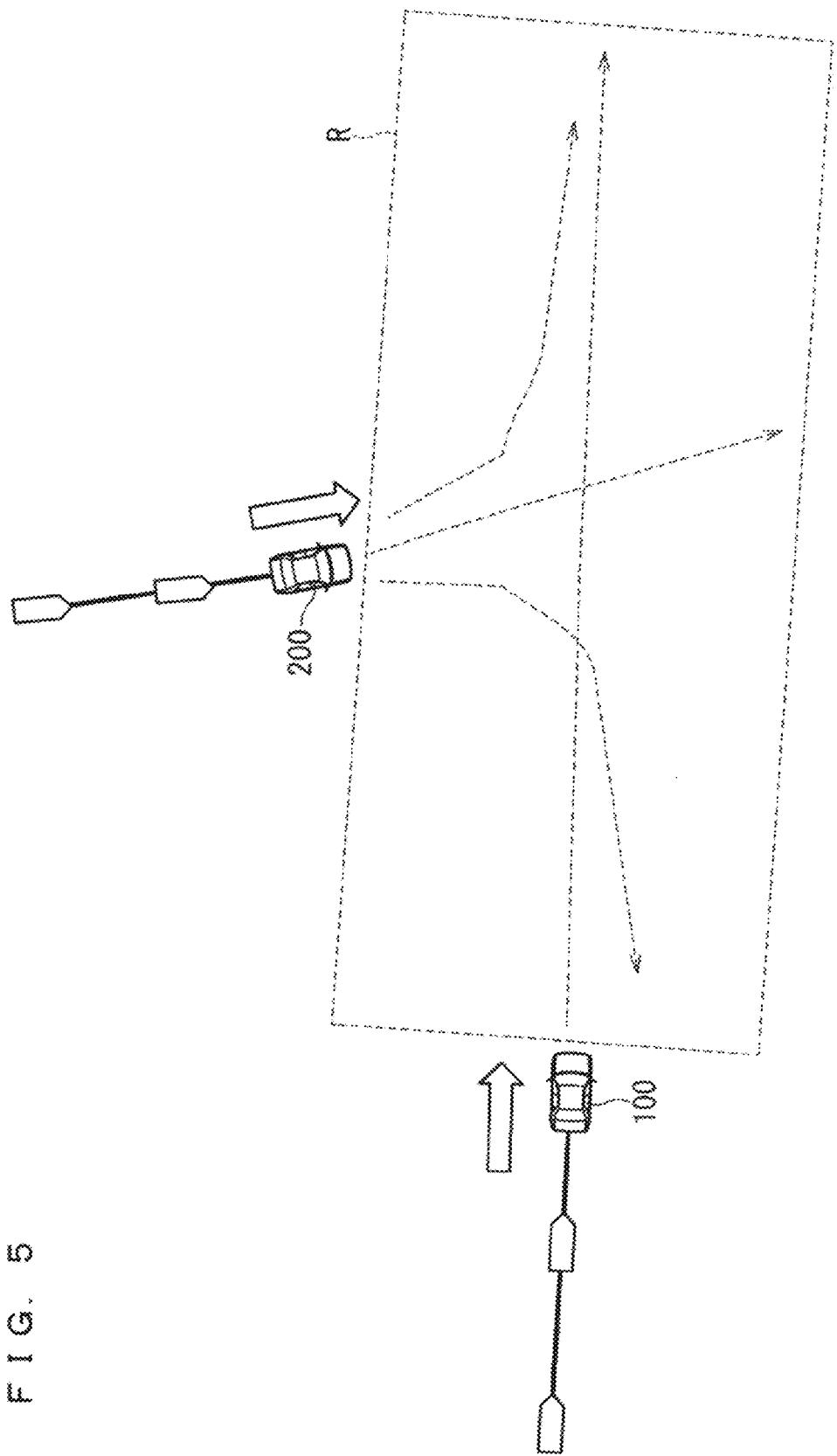
FIG. 5 is a view showing an instance in which the object of interest and the first neighboring object travel in intersecting directions and the traveling histories thereof do not overlap.

The traveling history includes information about the positions of each mobile object at a plurality of times in the past. In FIGS. 4 and 5, the figure of a vehicle designated by the reference numeral 100 indicates the current position of the object of interest 100, and frames connected with lines to the figure of the vehicle indicate past positions of the object of interest 100 which are represented by the traveling history. The traveling history of each mobile object will be represented in the same manner below in other figures. FIGS. 4 and 5 show instances in which the traveling history of the object of interest 100 and the traveling history of the first neighboring object 200 do not even partially overlap each other. FIG. 4 shows an instance in which the object of interest 100 and the first neighboring object 200 travel in the same direction, and FIG. 5 shows an instance in which the paths of travel of the object of interest 100 and the first neighboring object 200 intersect each other, i.e., in which the object of interest 100 and the first neighboring object 200 travel in intersecting directions. In FIG. 4, the object of interest 100 follows the first neighboring object 200 that precedes the object of interest 100. There is a region R in which the traveling histories do not overlap each other because the traveling history of the first neighboring object 200 is interrupted in front of the current position of the object of interest 100. In the region R in which the traveling histories do not overlap each other in this manner, there is a likelihood that the shape of the road is changed, so that it is difficult to correctly estimate the shape of the road. In FIG. 5, there is a region R in which the traveling histories do not overlap each other because the object of interest 100 and the first neighboring object 200 travel in intersecting directions. Even when it is anticipated that the paths of travel of the object of interest 100 and the first neighboring object 200 intersect each other based on the traveling histories thereof, there is a likelihood that the first neighboring object 200 travels actually on a road opposite to or merging into the road on which the object of interest 100 travels. When the object of interest 100 and the first neighboring object 200 travel on roads opposite to each other, the traveling histories do not overlap each other as in FIG. 5. In this manner, the actual road shape cannot be grasped without a map in the region R in which the traveling histories do not overlap each other. In the present description, traveling histories not even partially overlapping each other as shown in FIGS. 4 and 5 will be referred to simply as "traveling histories not overlapping each other", and traveling histories partially overlapping each other will be referred to simply as "traveling histories overlapping each other".

When the angular difference between the object of interest 100 and the first neighboring object 200 falls within the range of 0°±45°, the driving assistance device 10A judges that both of the mobile objects travel in the same direction. Also, when the angular difference between the object of interest 100 and the first neighboring object 200 falls within the range of 180°±45°, the driving assistance device 10A judges that both of the mobile objects travel in opposite directions. Also, when the angular difference between the object of interest 100 and the first neighboring object 200 falls within the range of 90°±45° or 270°±45°, the driving assistance device 10A judges that both of the mobile objects travel in intersecting directions.

When the angular difference between the object of interest 100 and the first neighboring object 200 is on borderlines for the judgment of the directions of travel of both of the mobile objects, e.g. 45° or −45°, the driving assistance device 10A judges that the directions of travel of both of the mobile objects is either one of the directions. In the present embodiment, the driving assistance device 10A judges that the directions of travel are the same direction when the angular difference is 45° and −45°, and judges that the directions of travel are the opposite directions when the angular difference is 135° and 225°.

Figure 6:
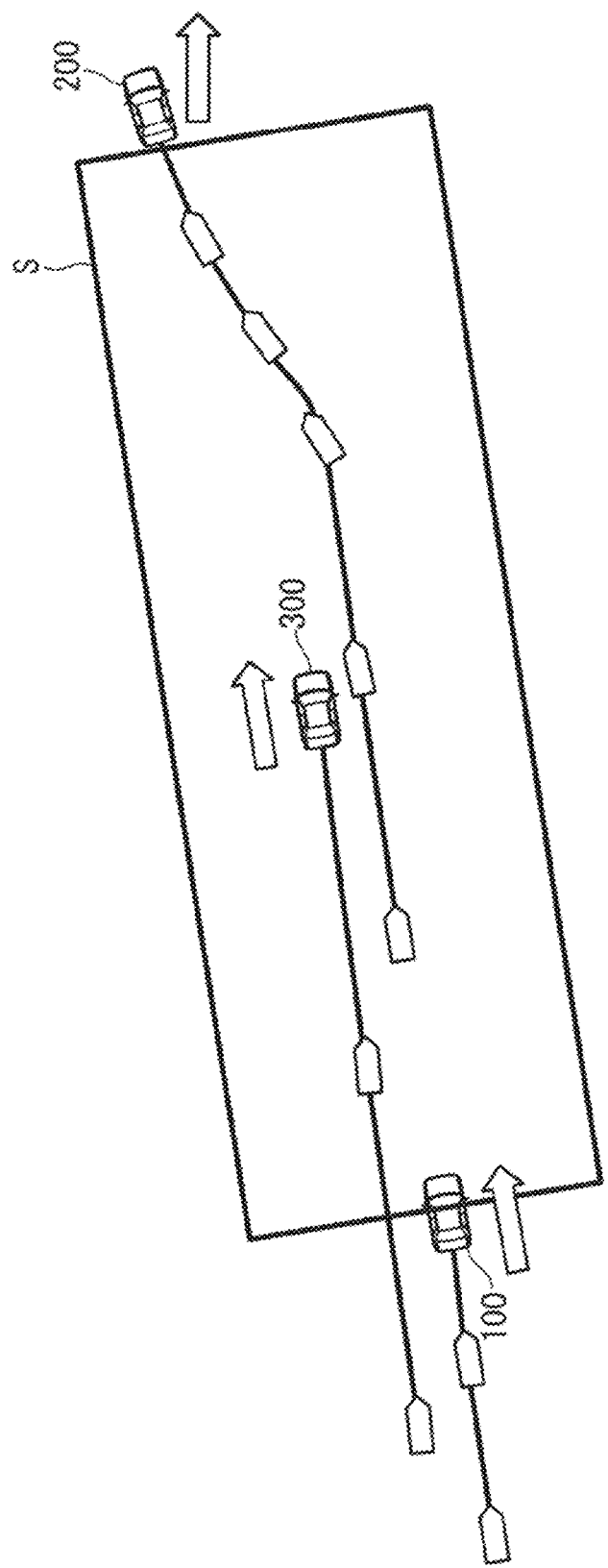
FIG. 6 is a view showing a search range of the second neighboring objects when the object of interest and the first neighboring object travel in the same direction.
Figure 7:
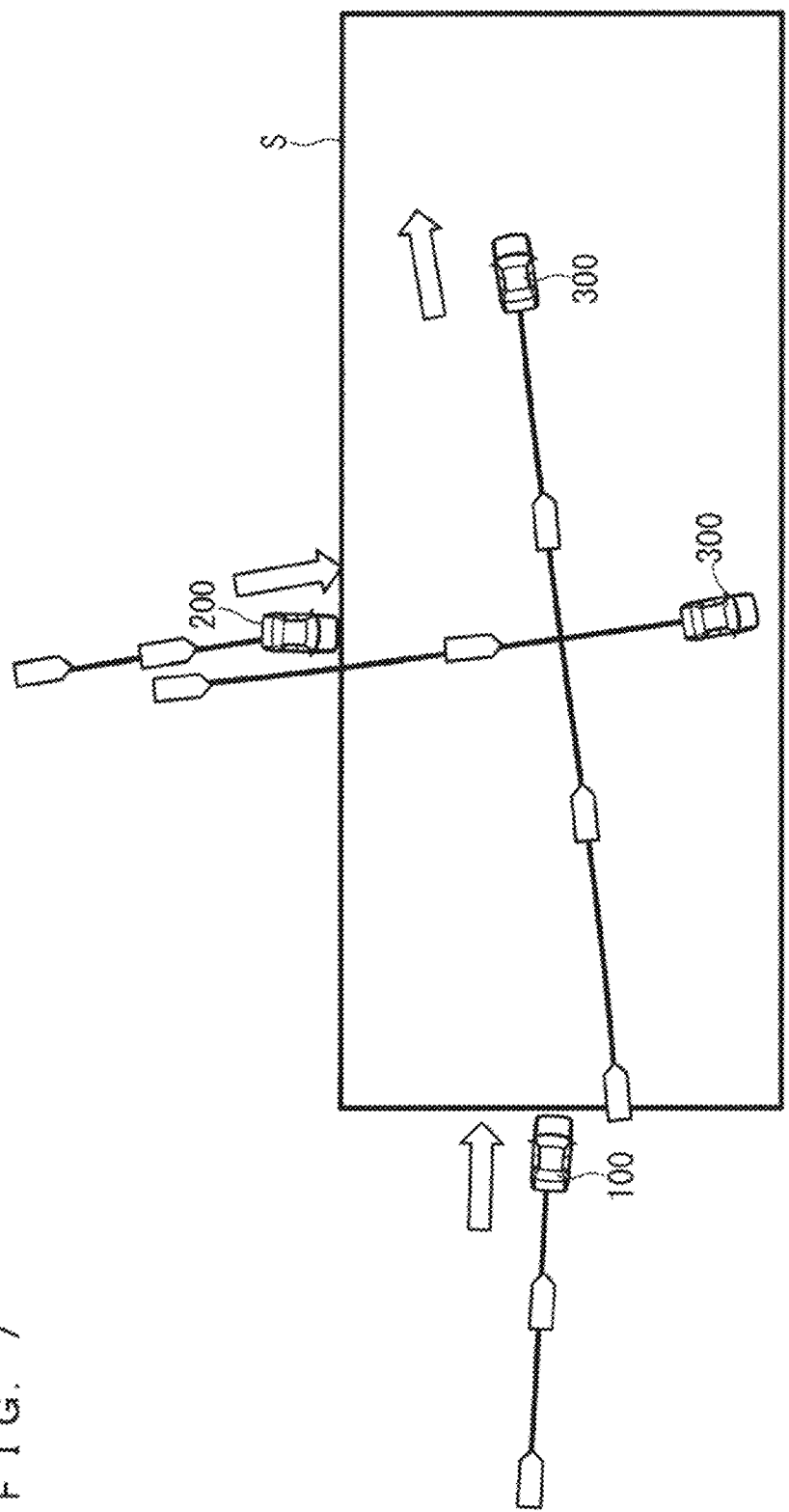
FIG. 7 is a view showing a search range of the second neighboring objects when the object of interest and the first neighboring object travel in the intersecting directions.

The range of search for the second neighboring object 300 by means of the neighboring object search section 24 will be described with reference to FIGS. 6 and 7. FIG. 6 is a view showing a search range S when the object of interest 100 and the first neighboring object 200 travel in the same direction. FIG. 7 is a view showing the search range S when the object of interest 100 and the first neighboring object 200 travel in the intersecting directions.

When the object of interest 100 and the first neighboring object 200 travel in the same direction, the neighboring object search section 24 defines a region lying between the current positions of the object of interest 100 and the first neighboring object 200 as the search range S for the second neighboring object 300, as shown in FIG. 6.

When the object of interest 100 and the first neighboring object 200 travel in the intersecting directions, the neighboring object search section 24 defines a region lying in front of the object of interest 100 and a region lying in front of the first neighboring object 200 as the search range S for the second neighboring object 300, as shown in FIG. 7. In accordance with the definition of the areas obtained by division as shown in FIG. 2, the search range is the area A, the area IL, or the area OC.

Figure 8:
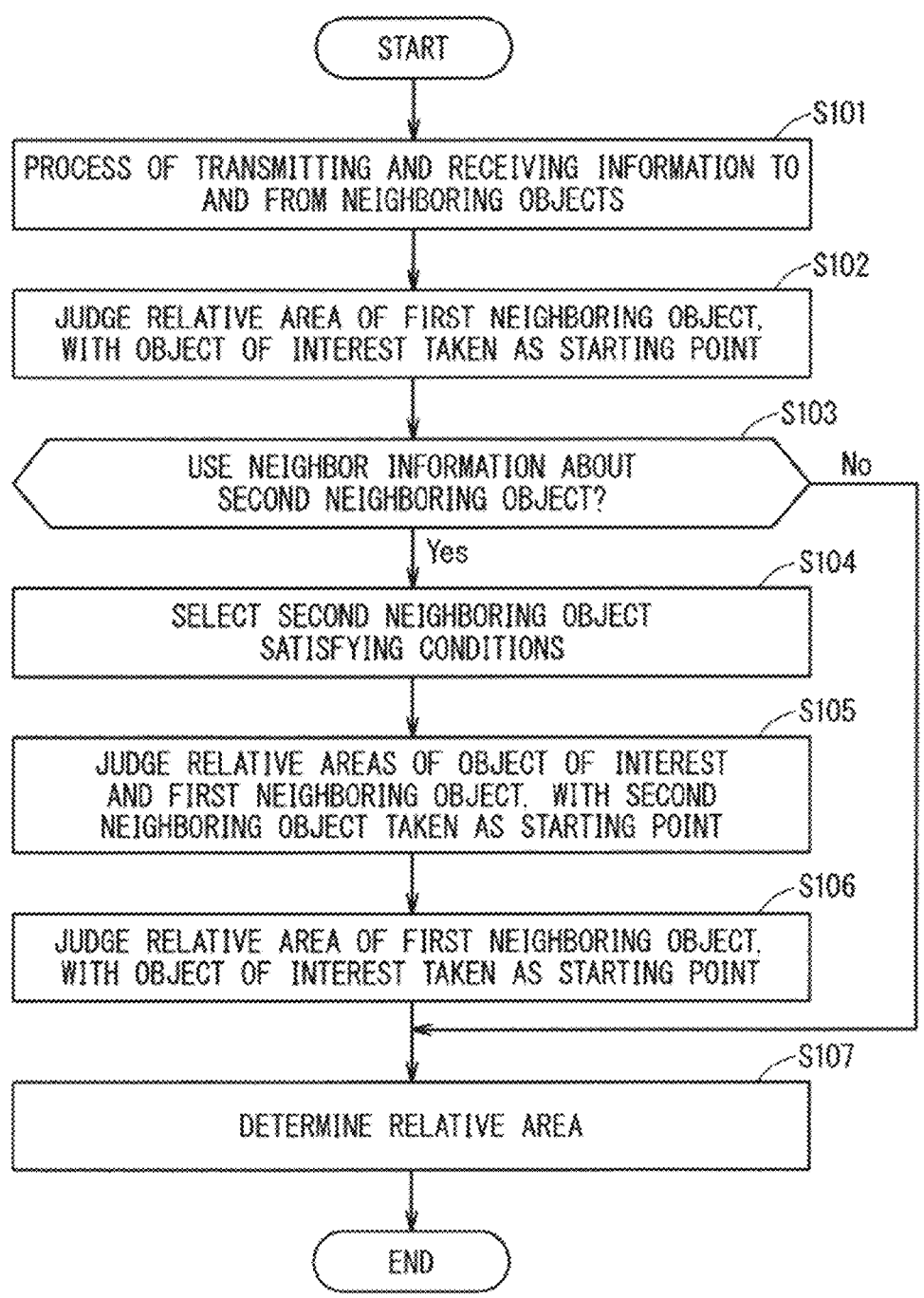
FIG. 8 is a flow diagram showing an operation of the driving assistance device according to the first embodiment.

Next, a general operation of the driving assistance device 10A according to the first embodiment will be described with reference to FIG. 8. The general operation of the driving assistance device 10A includes the process of acquiring information about the object of interest 100 to transmit the information to the first neighboring object 200 and the second neighboring object 300 and the process of acquiring information about the first neighboring object 200 to estimate the relative areas 40. The operation of the driving assistance device 10A shown in the flow diagram of FIG. 8 is executed during movement of the object of interest 100 and during a temporary halt of the object of interest 100.

Step S101 is the process of transmitting and receiving information to and from neighboring objects. The neighboring objects in Step S101 include all mobile objects present in the surrounding area of the object of interest 100 in addition to the first neighboring object 200 and the second neighboring object 300. In this process, the driving assistance device 10A acquires information about the object of interest 100 to transmit the information to the neighboring objects. Also, the driving assistance device 10A receives information from the neighboring objects. This process is specifically carried out by the following procedure.

The acquisition section 21 acquires information about the object of interest 100 through the sensor interface 14 from the equipment 101 mounted on the object of interest 100. The information about the object of interest 100 includes position, speed, acceleration, direction of travel, steering angle, brake control state, traveling history, predicted track, yaw rate, precision of each data, and the like.

The acquisition section 21 stores the acquired information about the object of interest 100 in the memory 121 as object-of-interest information 31 indicating the traveling history including the position of the object of interest 100 and the like. Specifically, the acquisition section 21 adds acquired traveling history information to the memory 121 each time the object of interest 100 moves a fixed distance, each time the object of interest 100 moves for a fixed period of time, or for each range within which errors in radius of curvature of the road on which the object of interest 100 travels is not greater than a fixed value.

The acquisition section 21 transmits the object-of-interest information 31 corresponding to a fixed period of time in the past through the communication interface 13 to the neighboring objects traveling around the object of interest 100.

The acquisition section 21 also acquires neighbor information 32 indicating the traveling history including the position of each neighboring object and the like through the communication interface 13. Specifically, the acquisition section 21 receives the neighbor information 32 through the communication interface 13 from the neighboring objects or external devices such as roadside devices at fixed time intervals. The acquisition section 21 writes the received neighbor information 32 into the memory 121. Described above is the process of transmitting and receiving information in Step S101.

Next, the relative position judgment section 22 judges the relative area of the first neighboring object 200 with the object of interest 100 taken as a starting point (Step S102). The relative position judgment section 22 judges the position of the first neighboring object 200 relative to the object of interest 100, based on the information received from the first neighboring object 200 in Step S101. The specific process is to be described below.

The relative position judgment section 22 reads the object-of-interest information 31 and the neighbor information 32 from the memory 121. Then, the relative position judgment section 22 calculates the current position of the first neighboring object 200 in a rectangular coordinate system in which the current position of the object of interest 100 is taken as the origin point and the orientation of the object of interest 100 is taken as the Y-axis direction to judge the relative area 40 of the first neighboring object 200 with the object of interest 100 taken as the starting point. The judgment on the relative area in Step S102 is made without the use of the neighbor information 32 about the second neighboring object 300, and is also referred to as a second judgment.

The relative position judgment section 22 performs the process of judging the relative area 40 (Step S102) after the acquisition section 21 acquires the neighbor information 32 in Step S101. However, the relative position judgment section 22 may perform the process of judging the relative area 40, based on the latest piece of object-of-interest information 31 and the neighbor information 32, at fixed time intervals or each time the object of interest 100 moves a fixed distance. Although the relative position judgment section 22 judges the relative area 40 based on the current positions of the object of interest 100 and the first neighboring object 200 in this description, other methods may be used for judgement on the relative area 40. For example, the relative position judgment section 22 may estimate the shape of the road based on the traveling history to judge the relative area 40 with reference to a specific location of the traveling history.

Next, the relative position judgment section 22 judges whether to use the neighbor information 32 about the second neighboring object 300 or not for the calculation of the position relative to the first neighboring object 200 (Step S103). Specifically, the relative position judgment section 22 reads the object-of-interest information 31 and the neighbor information 32 from the memory 121 to check whether the traveling histories of the object of interest 100 and the first neighboring object 200 overlap each other or not. The relative position judgment section 22 also judges which of the same road, the opposite roads, the intersecting roads, and others are the directions of travel of both of the mobile objects, based on the relationship between the orientation of the object of interest 100 and the orientation of the first neighboring object 200. Then, the relative position judgment section 22 judges whether to use the neighbor information 32 about the second neighboring object 300 or not, based on the directions of travel of the object of interest 100 and the first neighboring object 200, the presence/absence of an overlap between the traveling histories thereof, and the relative distance therebetween.

FIG. 9 illustrates conditions of use of the neighbor information 32 about the second neighboring object 300 for each relationship between the road on which the object of interest 100 travels and the road on which the first neighboring object 200 travels. In accordance with the conditions of use, the relative position judgment section 22 judges whether to use the neighbor information 32 about the second neighboring object 300 or not. In the example of FIG. 9, when the object of interest 100 and the first neighboring object 200 travel on the same road, the conditions of use of the neighbor information 32 about the second neighboring object 300 are that the traveling histories thereof do not overlap each other and that the relative distance therebetween is not greater than an upper limit in the relative areas. The fact that the relative distance between the object of interest 100 and the first neighboring object 200 is not greater than the upper limit in the relative areas means that the first neighboring object 200 is positioned within any one of the relative areas of the object of interest 100. For example, when the relative areas are defined by the areas within 300 m from the object of interest 100, the fact that the relative distance between the object of interest 100 and the first neighboring object 200 is not greater than the upper limit in the relative areas means that the relative distance between the object of interest 100 and the first neighboring object 200 is not greater than 300 m.

If the relationship between the road on which the object of interest 100 travels and the road on which the first neighboring object 200 travels is the opposite roads, the intersecting roads, or other roads, the relative position judgment section 22 judges that the neighbor information 32 about the second neighboring object 300 is to be used when the traveling histories do not overlap each other and when the relative distance is not less than a threshold value. This threshold value is less than the upper limit in the relative areas, and shall be 50 m, for example.

If the road relationship between the object of interest 100 and the first neighboring object 200, the presence/absence of an overlap between the traveling histories thereof, and the relative distance therebetween do not satisfy the conditions shown in FIG. 9, the relative position judgment section 22 judges that the neighbor information 32 about the second neighboring object 300 is not to be used. Then, the operation of the driving assistance device 10A proceeds to Step S107, and the present procedure is completed.

If the relative position judgment section 22 judges that the neighbor information 32 about the second neighboring object 300 is to be used in Step S103, the driving assistance device 10A selects the second neighboring object 300 that satisfies the conditions (Step S104). In this step, the neighboring object search section 24 initially reads the neighbor information 32 about mobile objects other than the object of interest 100 and the first neighboring object 200 from the memory 121, extracts mobile objects present in the search range for the third party from the neighbor information 32, and then informs the neighboring object selection section 23 about the extracted mobile objects. Then, the neighboring object selection section 23 selects a second neighboring object 300 that meets the selection conditions shown in FIG. 10 from among the second neighboring objects 300 about which information is given from the neighboring object search section 24.

FIG. 10 shows different selection conditions depending on the relationship between the road on which the object of interest 100 travels and the road on which the first neighboring object 200 travels. When the object of interest 100 and the first neighboring object 200 travel on the same road, the neighboring object selection section 23 selects the second neighboring object 300 in accordance with the following order of priority. The first condition is that the traveling history of the second neighboring object 300 overlaps those of both of the object of interest 100 and the first neighboring object 200. The second condition is that the positional accuracy of the second neighboring object 300 is high, i.e., not less than a threshold value. The third condition is that the region in which the traveling history of the second neighboring object 300 overlaps that of the object of interest 100 or the first neighboring object is long, i.e., not less than a threshold value. The fourth condition is that the time period for which the second neighboring object 300 travels side by side with the object of interest 100 is long, i.e., not less than a threshold value. If there are a plurality of second neighboring objects 300 satisfying the first condition, the neighboring object selection section 23 selects at least one of the second neighboring objects 300 which satisfies the second condition. If there are a plurality of second neighboring objects 300 satisfying the first and second conditions, the neighboring object selection section 23 selects at least one of the second neighboring objects 300 which satisfies the third condition. If there are a plurality of second neighboring objects 300 satisfying the first to third conditions, the neighboring object selection section 23 selects at least one of the second neighboring objects 300 which satisfies the fourth condition. If there are a plurality of second neighboring objects 300 satisfying the first to fourth conditions, the neighboring object selection section 23 selects one of the second neighboring objects 300 in a random fashion. Although the first condition is that the traveling history of the second neighboring object 300 overlaps those of both of the object of interest 100 and the first neighboring object 200, this is merely an example. The first condition may be defined that the traveling history of the second neighboring object 300 overlaps that of at least one of the object of interest 100 and the first neighboring object 200.

If the road on which the object of interest 100 travels and the road on which the first neighboring object 200 travels are the opposite roads, the intersecting roads, or other roads, the neighboring object selection section 23 selects the second neighboring object 300 in accordance with the following order of priority. The first condition is that the second neighboring object 300 travels in the traveling area of the object of interest 100 and the first neighboring object 200. The second condition is that the region in which the traveling history of the second neighboring object 300 does not overlap those of the object of interest 100 and the first neighboring object 200 is maximum. The third condition is that the positional accuracy of the second neighboring object 300 is high.

If the neighboring object selection section 23 selects the second neighboring object 300, the process of the driving assistance device 10A proceeds to Step S105. The neighboring object selection section 23 selects the second neighboring object 300, based on the conditions of FIG. 10. However, the neighboring object selection section 23 need not select the second neighboring object 300 if the positional accuracy of the second neighboring object 300 is low. If there is no second neighboring object 300 that satisfies the conditions in Step S104, the subsequent processes in Steps S105 and S106 are skipped.

In Step S105, the driving assistance device 10A judges the relative areas in which the object of interest 100 and the first neighboring object 200 are present, with the second neighboring object 300 selected in Step S104 taken as the starting point. In this step, the relative position judgment section 22 performs a coordinate transformation on the positions of the object of interest 100 and the first neighboring object 200, with the position and orientation of the second neighboring object 300 taken as the starting point, to judge the relative areas as shown in FIG. 2. The process in this step is similar to the process in Step S102 if the starting point is changed from the object of interest 100 to the second neighboring object 300 and the object for judgment of the relative areas is changed from the first neighboring object 200 to the object of interest 100 and the first neighboring object 200.

FIG. 11 shows a coordinate system with the second neighboring object 300 taken as the origin point. As shown in FIG. 11, the relative position judgment section 22 calculates the relative coordinates (x1, y1) of the object of interest 100 and the relative coordinates (x2, y2) of the first neighboring object 200, with the second neighboring object 300 taken as the origin point.

The relative position judgment section 22 uses the relative coordinates and a relative orientation to judge the relative areas of the object of interest 100 and the first neighboring object 200, with the second neighboring object 300 taken as the starting point. In this step, the relative position judgment section 22 may use the traveling history or a predicted track to calculate the relative coordinates (x1", y1) of the object of interest 100 and the relative coordinates (x2", y2) of the first neighboring object 200, with the second neighboring object 300 taken as the starting point, thereby judging the relative areas.

In Step S105, the driving assistance device 10A has judged the relative area of the object of interest 100 with the second neighboring object 300 taken as the starting point, and the relative area of the first neighboring object 200 with the second neighboring object 300 taken as the starting point. Using the results, the driving assistance device 10A judges the relative area of the first neighboring object 200 with the object of interest 100 taken as the starting point (Step S106). The judgment of the relative area in Step S106 is made with the use of the neighbor information 32 about the second neighboring object 300, and is also referred to as a first judgment.

Figure 12:
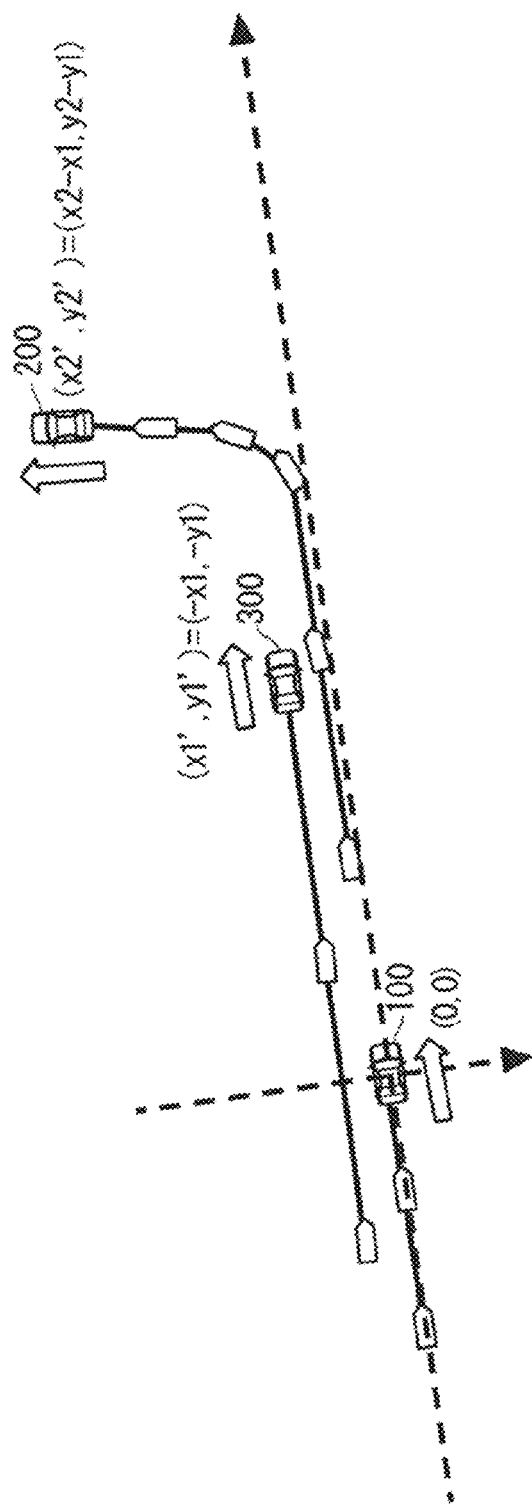
FIG. 12 is a view showing a coordinate system with the object of interest taken as the origin point.

The relative position judgment section 22 converts the coordinate system shown in FIG. 11 with the second neighboring object 300 taken as the starting point into the coordinate system shown in FIG. 12 with the object of interest 100 taken as the starting point. The relative coordinates (x2', y2') of the second neighboring object 300 with the object of interest 100 taken as the starting point is represented as (x2−x1, y2−y1), and the relative coordinates (x1', y1') of the first neighboring object 200 with the object of interest 100 taken as the starting point is represented as (−x1, −y1).

The relative position judgment section 22 uses the relative coordinates of the first neighboring object 200 with the object of interest 100 taken as the starting point to judge the relative area of the first neighboring object 200 with the object of interest 100 taken as the starting point.

Figure 13:
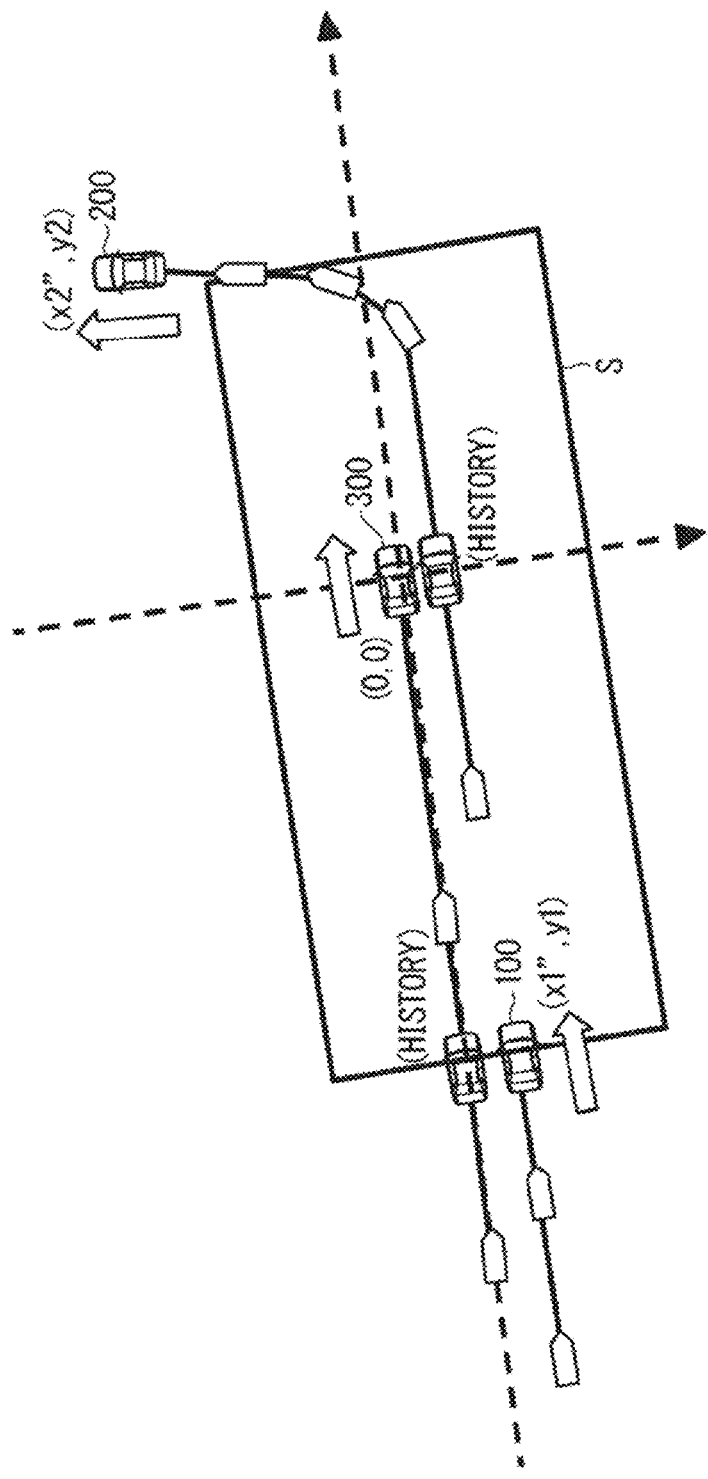
FIG. 13 is a view showing a coordinate system with the second neighboring object taken as the origin point.
Figure 14:
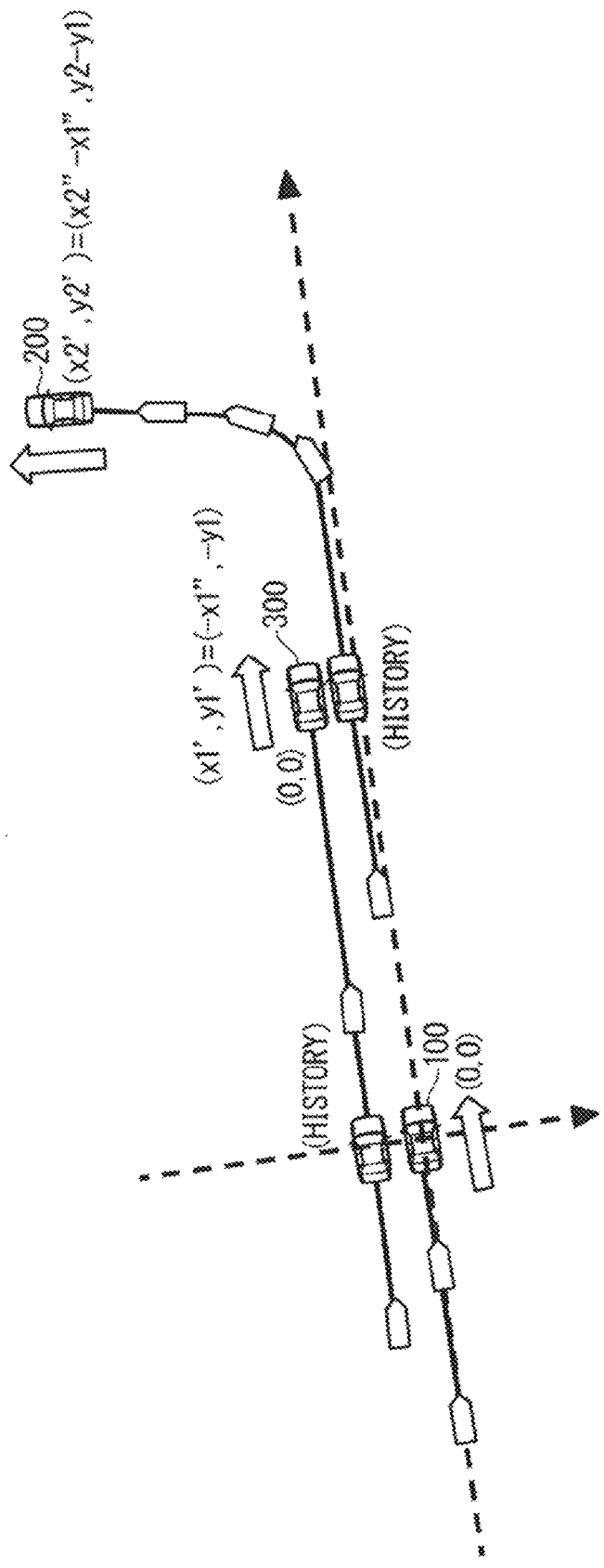
FIG. 14 is a view showing a coordinate system with the object of interest taken as the origin point.

When the relative position judgment section 22 uses the traveling history or the predicted track as shown in FIG. 13 to calculate the relative coordinates of the object of interest 100 and the first neighboring object 200 with the second neighboring object 300 taken as the starting point, the relative position judgment section 22 judges the relative area of the first neighboring object 200 with the object of interest 100 taken as the starting point by defining the relative coordinates of the second neighboring object 300 with the object of interest 100 taken as the starting point as (−x1", −y1) and defining the relative coordinates of the first neighboring object 200 as (x2"−x1", y2−y1), as shown in FIG. 14.

Although the judgment of the relative areas from the relative coordinates has described above, the relative position judgment section 22 may calculate the relative area of the first neighboring object 200 with the object of interest 100 taken as the starting point, based on the relative areas of the object of interest 100 and the first neighboring object 200 with the second neighboring object 300 taken as the starting point and on the relative distances between the second neighboring object 300 and the objects 100 and 200, as shown in FIG. 15. In FIG. 15, "POS HV" in the first column designates the relative areas of the object of interest 100 with the second neighboring object 300 taken as the starting point, and "POS RV" in the first row designates the relative areas of the first neighboring object 200 with the second neighboring object 300 taken as the starting point. In the example of FIG. 15, when both the relative areas of the object of interest 100 and the first neighboring object 200 with the second neighboring object 300 taken as the starting point are the area A, the relative area of the first neighboring object 200 with the object of interest 100 taken as the starting point is the area A or the area B. The relative position judgment section 22 judges that the relative area of the first neighboring object 200 with the object of interest 100 taken as the starting point is the area A when D1>D2, and judges that the relative area of the first neighboring object 200 with the object of interest 100 taken as the starting point is the area B when D1<D2, where D1 is the distance between the second neighboring object 300 and the object of interest 100, and D2 is the distance between the first neighboring object 200 and the object of interest 100.

Next, the driving assistance device 10A determines the final relative area of the first neighboring object 200 with the object of interest 100 taken as the starting point, based on the result of judgment of the relative area in Step S106 and the result of judgment of the relative area in Step S102 (Step S107). If the result of judgment in Step S106 is absent, the relative position judgment section 22 determines that the result of judgment in Step S102 is the relative area. If the result of judgment in Step S106 is present, the relative position judgment section 22 determines that the result of judgment in Step S106 is the relative area. These are merely examples of the method of determination, and other methods may be used to determine the final relative area. For example, the relative position judgment section 22 may observe the two results of judgment for a fixed time period to determine that the result generated most frequently is the relative area. Alternatively, the relative position judgment section 22 may assign weights to the two results of judgment to determine the final relative area.

A-3. First Modification

With reference to FIG. 9, one of the conditions of use of the neighbor information 32 about the second neighboring object 300 mentioned above is that the traveling histories of the object of interest 100 and the first neighboring object 200 do not overlap each other. However, if the traveling histories of the object of interest 100 and the first neighboring object 200 overlap each other, the driving assistance device 10A may use the neighbor information 32 about the second neighboring object 300 to judge the relative areas. In this case, even if the traveling histories of the object of interest 100 and the first neighboring object 200 overlap each other, the neighboring object search section 24 judges that the neighbor information 32 about the second neighboring object 300 is to be used in Step S103 of FIG. 8 when the positional accuracies of the object of interest 100 and the first neighboring object 200 are low.

A-4. Second Modification

With reference to FIG. 9, one of the conditions of use of the neighbor information 32 about the second neighboring object 300 mentioned above is that the relative distance between the object of interest 100 and the first neighboring object 200 is a fixed distance or more if the relationship between the object of interest 100 and the first neighboring object 200 is opposite, intersecting, or others. However, if the relative distance between the object of interest 100 and the first neighboring object 200 is short, the driving assistance device 10A may use the neighbor information 32 about the second neighboring object 300 to judge the relative areas. In this case, even if the relative distance between the object of interest 100 and the first neighboring object 200 is a fixed distance or less, the neighboring object search section 24 judges that the neighbor information 32 about the second neighboring object 300 is to be used in Step S103 of FIG. 8 when the positional accuracies of the object of interest 100 and the first neighboring object 200 are low.

A-5. Third Modification

In the first embodiment, it is described that the neighboring object selection section 23 selects the single second neighboring object 300 in accordance with the selection conditions shown in FIG. 10. However, the neighboring object selection section 23 may select a plurality of second neighboring objects 300, and the relative position judgment section 22 may perform the processes in Steps S105 and S106 of FIG. 8 on each of the selected second neighboring objects 300. As an example, in Step S104 of FIG. 8, the neighboring object selection section 23 excludes at least one second neighboring object 300 with low positional accuracy from among the second neighboring objects 300 about which information is given from the neighboring object search section 24, and the relative position judgment section 22 performs the processes in Steps S105 and S106 of FIG. 8 on the remainder of the second neighboring objects 300. Also, in Step S107, the relative position judgment section 22 collects the relative areas judged based on the neighbor information 32 about the plurality of second neighboring objects 300 to adopt the result judged most as the final relative area.

A-6. Fourth Modification

In the first embodiment, the functions of the functional components of the driving assistance device 10A are implemented by software. However, the functions of the functional components of the driving assistance device 10A are implemented by hardware in a fourth modification. Differences from the first embodiment will be described below according to the fourth modification.

When the functions of the functional components are implemented by hardware, the driving assistance device 10A includes the communication interface 13, the sensor interface 14, and an electronic circuit. The electronic circuit is a dedicated electronic circuit for implementing the functions of the functional components of the driving assistance device 10A and the functions of the storage device. Assumable examples of the electronic circuit include a single circuit, composite circuits, a programmed processor, a parallel-programmed processor, a logic IC, a GA (Gate Array), an ASIC (Application Specific Integrated Circuit), and a FPGA (Field-Programmable Gate Array). The functions of the functional components may be implemented by a single electronic circuit. Alternatively, the functions of the functional components may be implemented in a distributed manner by a plurality of electronic circuits.

A-7. Fifth Modification

Some of the functions of the functional components of the driving assistance device 10A may be implemented by hardware whereas the others be implemented by software. The processor 11, the storage device 12, and the electronic circuit are collectively referred to as a processing circuit.

A-8. Sixth Modification

A-8. Sixth Modification

The instance in which the relative area of the first neighboring object 200 with the object of interest 100 taken as the starting point is judged from the traveling histories of the object of interest 100, the first neighboring object 200, and the second neighboring object 300 is described in the first embodiment. The driving assistance device 10A may use the operating situation of a direction indicator of a mobile object to judge the relative area. Specifically, the acquisition section 21 acquires direction indicator information indicating that the direction indicator of the object of interest 100 has operated through the sensor interface 14. The direction indicator information is stored in the memory 121. The relative position judgment section 22 references the direction indicator information to exclude pieces of the neighbor information 32 and object-of-interest information 31 which are provided at the time of occurrence of the operation of the direction indicator from among those stored in the memory 121, thereby judging the relative area with the use of the remaining pieces of the neighbor information 32 and object-of-interest information 31.

A-9. Seventh Modification

With reference to FIG. 9, one of the conditions for the judgment of the relative positional relationship between the object of interest 100 and the first neighboring object 200 with the use of the neighbor information 32 about the second neighboring object 300 mentioned above is that the traveling histories of the object of interest 100 and the first neighboring object 200 do not overlap each other. However, the driving assistance device 10A may use the neighbor information 32 about the second neighboring object 300, regardless of whether the traveling histories overlap each other or not. Then, the driving assistance device 10A may assign weights to the result of judgement (the result of the first judgment) of the relative area of the first neighboring object 200 with the object of interest 100 taken as the starting point with the use of the neighbor information 32 about the second neighboring object 300 and the result of judgement (the result of the second judgment) of the relative area of the first neighboring object 200 with the object of interest 100 taken as the starting point without the use of the neighbor information 32 about the second neighboring object 300 in accordance with the presence/absence of the overlap between the traveling histories of the object of interest 100 and the first neighboring object 200 to judge the relative area with high accuracy and with robustness.

As a specific example, in Step S103 of FIG. 8, the relative position judgment section 22 judges that the traveling history of the second neighboring object 300 is to be used even if the traveling histories of the object of interest 100 and the first neighboring object 200 overlap each other. Thus, the answer to Step S103 is always "Yes", and the transition from Step S103 to Step S107 does not occur. In Step S107, the relative position judgment section 22 assigns greater weights to the result of judgement (the result of the first judgment) in Step S106 and assigns smaller weights to the result of judgement (the result of the second judgment) in Step S102, when the traveling histories of the object of interest 100 and the first neighboring object 200 do not overlap each other than when the traveling histories overlap each other. Thus, the relative position judgment section 22 judges the relative area in a comprehensive manner.

A-10. Eighth Modification

In the first embodiment, it is described that the driving assistance device 10A calculates the relative coordinates from the absolute coordinates of each of the mobile objects to judge the relative positional relationship between the mobile objects. However, the driving assistance device 10A may calculate the range of the relative positional relationship shown in FIG. 2 with the use of the absolute coordinates without calculating the relative coordinates to judge the relative area with the use of the absolute coordinates.

A-11. Effects

As described above, the driving assistance device 10A according to the first embodiment includes the relative position judgment section 22 for making the judgment on the relative positional relationship between the object of interest 100 and the first neighboring object 200 as the first judgment, based on the relative positional relationship between the second neighboring object 300 and the object of interest 100 and the relative positional relationship between the second neighboring object 300 and the first neighboring object 200. In this manner, the relative position judgment section 22 uses the neighbor information 32 about the second neighboring object 300 that is the third party other than the object of interest 100 and the first neighboring object 200 to judge the relative positional relationship between the object of interest 100 and the first neighboring object 200. Thus, the relative position judgment section 22 is capable of judging the relative positions with high accuracy even when the traveling histories of the object of interest 100 and the first neighboring object 200 do not overlap each other or even when the relative distance between the mobile objects is long.

Also, the relative position judgment section 22 is capable of calculating the relative coordinates of the object of interest 100 and the first neighboring object 200, with the second neighboring object 300 taken as the origin point, based on the object-of-interest information 31 and the neighbor information 32, to calculate the relative coordinates of the first neighboring object 200, with the object of interest 100 taken as the origin point, thereby making the first judgment.

Alternatively, the relative position judgment section 22 calculates the relative areas of the object of interest 100 and the first neighboring object 200 with the second neighboring object 300 taken as the starting point and the relative distance between the second neighboring object 300 and the objects 100 and 200, based on the object-of-interest information and neighbor information, to make a judgment on the relative area of the first neighboring object 200 with the object of interest 100 taken as the starting point as the first judgment, based on the results of calculation. In this manner, the judgment is made based on the relative areas and the relative distance, rather than the coordinates. This accommodates GPS errors to avoid accumulation of the GPS errors.

Also, the relative position judgment section 22 makes the first judgment if it is judged that the use of the neighbor information 32 about the second neighboring object 300 is necessary, based on the relationship between the road on which the object of interest 100 travels and the road on which the first neighboring object 200 travels and the relative distance between the object of interest 100 and the first neighboring object 200. Thus, the neighbor information 32 about the second neighboring object 300 is used efficiently.

Also, the relative position judgment section 22 makes the first judgment if the traveling histories of the object of interest 100 and the first neighboring object 200 do not even partially overlap each other. Thus, the range of estimation of the shape of the road is increased by the use of the traveling history of the second neighboring object 300 for the region in which the traveling histories do not overlap each other.

Also, the relative position judgment section 22 makes the judgment on the relative positional relationship between the object of interest 100 and the first neighboring object 200, based on the object-of-interest information 31 and the neighbor information about the first neighboring object 200, as the second judgment as well as the first judgment. The relative position judgment section 22 assigns greater weights to the result of the first judgment and assigns smaller weights to the result of the second judgment, when the traveling histories of the object of interest 100 and the first neighboring object 200 do not even partially overlap each other than when the traveling histories overlap each other. This allows the judgment of the relative area with high accuracy and with robustness in accordance with the situations of the overlap between the traveling histories of the object of interest 100 and the first neighboring object 200.

The driving assistance device 10A according to the first embodiment includes the neighboring object selection section 23 for selecting the single second neighboring object 300 from among the plurality of second neighboring objects 300, based on the length of the region in which the traveling histories of the second neighboring object 300 and the object 100 or 200 partially overlap each other. The relative position judgment section 22 makes the judgment on the relative positional relationship between the object of interest 100 and the first neighboring object 200 as the first judgment, based on the relative positional relationship between the second neighboring object 300 selected by the neighboring object selection section 23 and the object of interest 100 and the relative positional relationship between the second neighboring object 300 selected by the neighboring object selection section 23 and the first neighboring object 200. Thus, when the plurality of second neighboring objects 300 are present, the driving assistance device 10A is capable of using the second neighboring object 300 having a longer region in which the traveling history thereof overlaps the traveling history of the object of interest 100 or the first neighboring object 200.

B. Second Embodiment

B-1. Configuration

FIG. 16 shows a configuration of a driving assistance device 10B according to a second embodiment. The driving assistance device 10B further includes an altitude difference judgment section 25 in addition to the components of the driving assistance device 10A of the first embodiment. The configuration of the driving assistance device 10B is similar to that of the driving assistance device 10A except the altitude difference judgment section 25.

The altitude difference judgment section 25 uses altitude information about the second neighboring object 300 to judge whether the object of interest 100 and the first neighboring object 200 travel on different roads differing in altitude or not. Examples of the instance in which the object of interest 100 and the first neighboring object 200 travel on different roads differing in altitude include an instance in which one of the object of interest 100 and the first neighboring object 200 travels on an elevated road whereas the other travels on a road under the elevated road and an instance in which one of the object of interest 100 and the first neighboring object 200 travels on an upper road at a grade-separated intersection whereas the other travels on a lower road at the grade-separated intersection.

B-2. Operation

An operation of the driving assistance device 10B according to the second embodiment will be described with reference to FIG. 17. The flow diagram of FIG. 17 differs from the flow diagram of FIG. 8 described in the first embodiment in including Step S106A for an altitude difference judgment process between Steps S106 and S107 and in making a transition to Step S106A, rather than Step S107, if the answer to the judgment block in Step S103 is "No".

In Step S106A, the altitude difference judgment section 25 uses the altitude information about a plurality of mobile objects present around the object of interest 100 to judge whether the object of interest 100 and the first neighboring object 200 travel on different roads differing in altitude or not.

Figure 18:
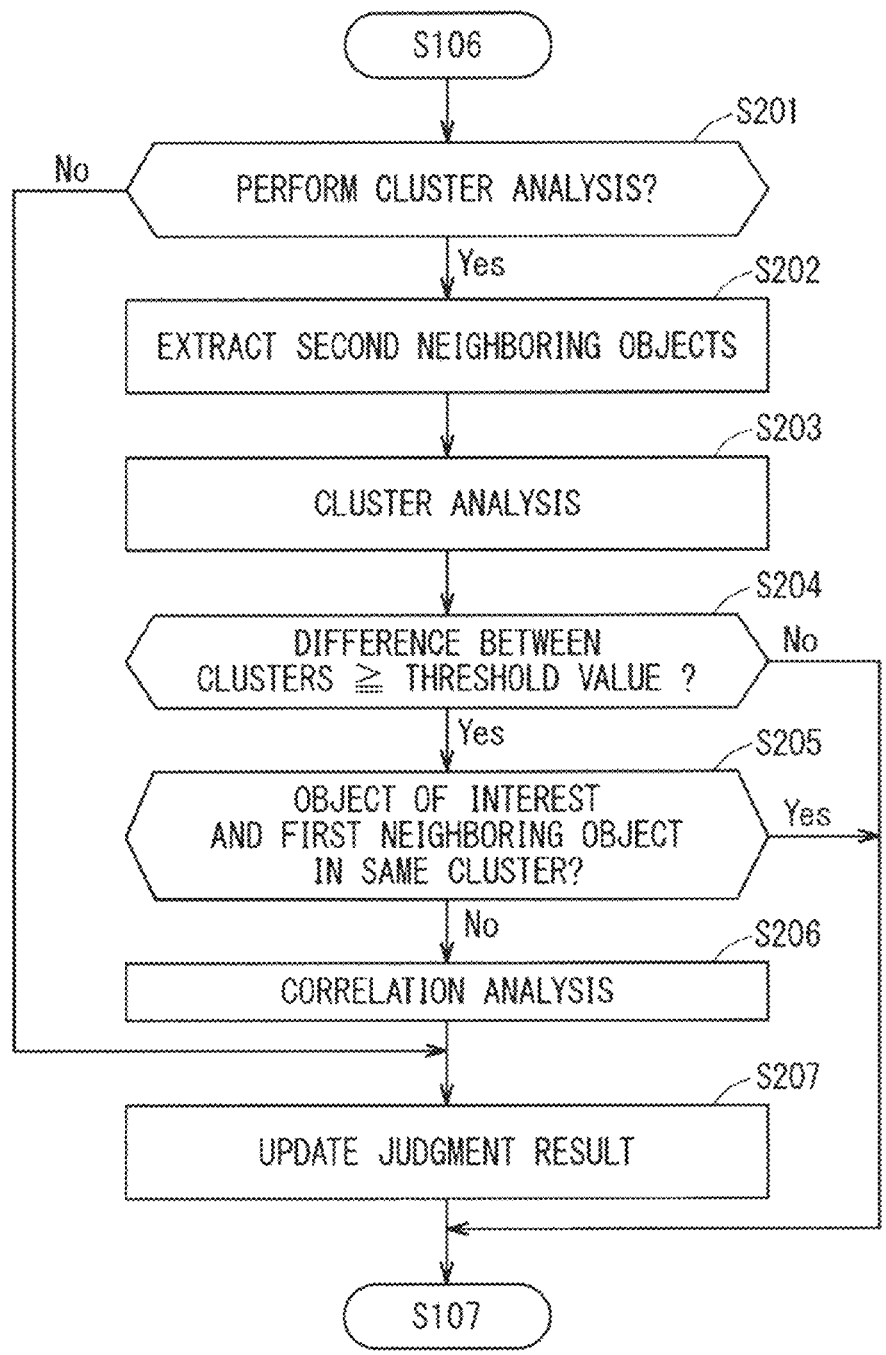
FIG. 18 is a flow diagram showing a detailed processing sequence of Step S106A of FIG. 17.
Figure 19:
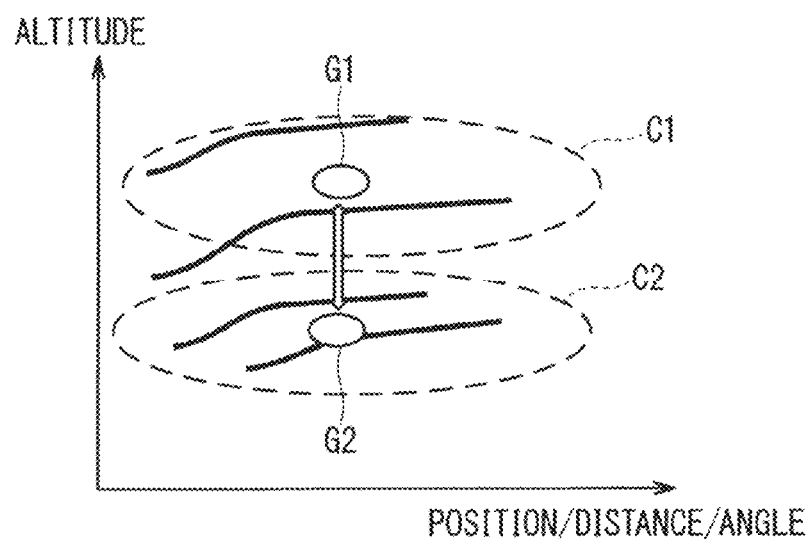
FIG. 19 is a diagram showing an instance in which a difference in altitude between the centers of gravity of two clusters is less than a threshold value.
Figure 20:
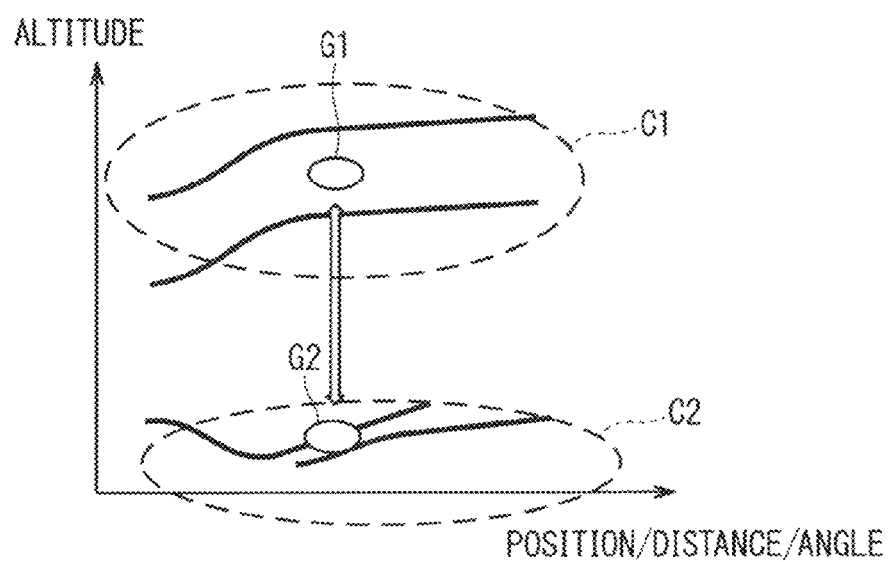
FIG. 20 is a diagram showing an instance in which the difference in altitude between the centers of gravity of two clusters is not less than the threshold value.

FIG. 18 shows a detailed processing sequence of Step S106A. The altitude difference judgment section 25 analyzes information about the positions and altitudes of the object of interest 100 and a plurality of neighboring objects including the first neighboring object 200 to classify the neighboring objects into two clusters. FIG. 19 shows an instance in which the difference in altitude between the center of gravity G1 of a cluster C1 and the center of gravity G2 of a cluster C2 is less than a threshold value. In this case, the altitude difference judgment section 25 judges that the object of interest 100 and the first neighboring object 200 travel on the same road. FIG. 20 shows an instance in which the difference in altitude between the center of gravity G1 of the cluster C1 and the center of gravity G2 of the cluster C2 is not less than the threshold value. In this case, the altitude difference judgment section 25 judges that the object of interest 100 and the first neighboring object 200 travel on different roads differing in altitude.

First, the altitude difference judgment section 25 judges whether to perform the cluster analysis or not (Step S201). In this step, if the difference in altitude between the object of interest 100 and the first neighboring object 200 is less than a fixed value, the altitude difference judgment section 25 judges that the cluster analysis is to be performed because whether both of the objects 100 and 200 travel on different roads differing in altitude or not cannot be judged from the difference in altitude therebetween, and then proceeds to the process in Step S202. On the other hand, if the difference in altitude between the object of interest 100 and the first neighboring object 200 is not less than the fixed value, the altitude difference judgment section 25 judges that the objects 100 and 200 travel on different roads differing in altitude to judge that the cluster analysis is not to be performed, and then proceeds to the process in Step S207. When calculating the difference in altitude between the object of interest 100 and the first neighboring object 200, the altitude difference judgment section 25 may estimate the altitude of an intersecting point or a halfway point from changes in altitude in the traveling histories to calculate the difference in altitude at that point.

In Step S202, the altitude difference judgment section 25 extracts a plurality of second neighboring objects 300 present around the object of interest 100 to acquire the neighbor information 32 about the extracted second neighboring objects 300 from the memory 121. For example, the range of extraction of the second neighboring objects 300 is a square area extending 100 m forwardly, rearwardly, leftwardly, and rightwardly from the object of interest 100 taken as the origin point.

Next, the altitude difference judgment section 25 performs the cluster analysis on the altitudes of the current position and history points of the plurality of second neighboring objects 300 extracted in Step S202 to classify the second neighboring objects 300 into two clusters (Step S203). The altitude difference judgment section 25 may use a hierarchical cluster analysis or a non-hierarchical cluster analysis as the cluster analysis. Also, the altitude difference judgment section 25 may use a nearest neighbor method (minimum distance method), a furthest neighbor method (maximum distance method), or other methods as a technique for the cluster analysis. Also, the altitude difference judgment section 25 may classify the second neighboring objects 300 with respect to the altitude or classify the altitude information with respect to the relative distance, the relative angle, the relative position, and the like.

Next, the altitude difference judgment section 25 calculates the value of the center of gravity of the altitude of each cluster to judge whether the difference therebetween is less than a threshold value or not (Step S204). If the difference in value of the center of gravity of the altitude between the clusters is not less than the threshold value, the altitude difference judgment section 25 judges that there is a likelihood that the object of interest 100 and the first neighboring object 200 travel on different roads differing in altitude, and then proceeds to Step S205. On the other hand, if the difference in value of the center of gravity of the altitude between the clusters is less than the threshold value, the altitude difference judgment section 25 judges that the object of interest 100 and the first neighboring object 200 travel on the same road, and then terminates the procedure of FIG. 18. In this step, the altitude difference judgment section 25 judges the difference in value of the center of gravity of the altitude. However, the altitude difference judgment section 25 may use the average value or the median value in place of the value of the center of gravity.

In Step S205, the altitude difference judgment section 25 judges whether the object of interest 100 and the first neighboring object 200 are included in the same cluster or not. If both of the object of interest 100 and the first neighboring object 200 are included in the same cluster, the altitude difference judgment section 25 judges that the object of interest 100 and the first neighboring object 200 travel on the same road, and terminates the procedure of FIG. 18. On the other hand, if the object of interest 100 and the first neighboring object 200 are included in different clusters, the altitude difference judgment section 25 judges that there is a likelihood that the object of interest 100 and the first neighboring object 200 travel on different roads differing in altitude, and then proceeds to Step S206.

In Step S206, the altitude difference judgment section 25 performs a correlation analysis on the altitude information about the two clusters with respect to the relative distance or the relative angle to calculate respective correlation coefficients. If both of the correlation coefficients for the two clusters are not less than a threshold value, it can be judged that the mobile objects belonging to the same cluster travel on the same road. Thus, the altitude difference judgment section 25 assigns greater weights to the result of the judgment that there is a likelihood that the object of interest 100 and the first neighboring object 200 travel on different roads differing in altitude. Then, the relative position judgment section 22 judges that relative area of the first neighboring object 200 with the object of interest 100 taken as the starting point is other roads (Other), and updates the result of judgment in Step S106 of FIG. 17 (Step S207).

Figure 17:
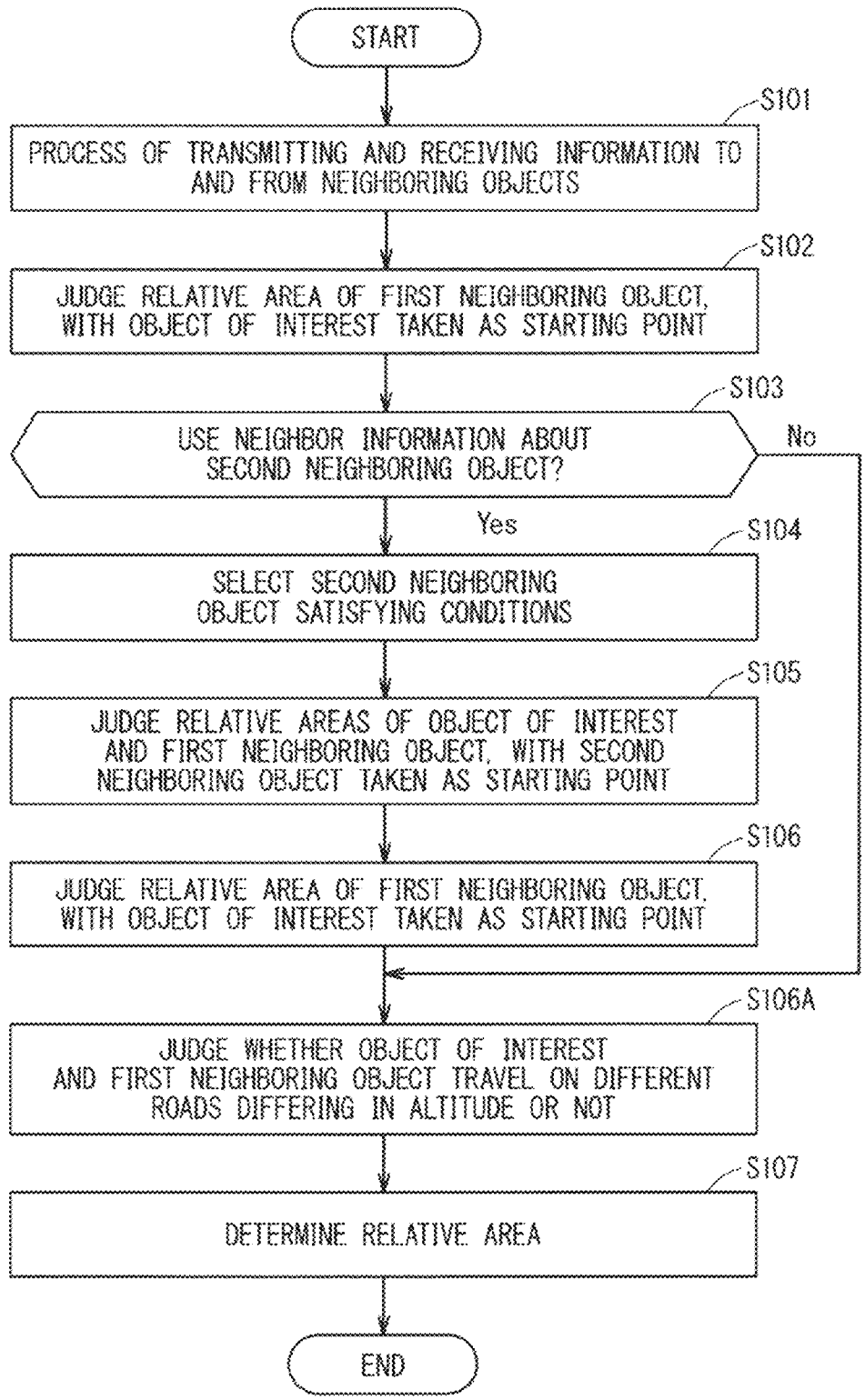
FIG. 17 is a flow diagram showing an operation of the driving assistance device according to the second embodiment.

In Step S107 of FIG. 17, the relative position judgment section 22 determines the relative area, based on the result of judgment of the relative area in Step S102 which does not use the second neighboring object 300 and the result of judgment of the relative area in Step S106 which uses the second neighboring object 300. If the result of judgment of the relative area in Step S106 is updated in Step S207 of FIG. 17, the relative position judgment section 22 uses the result of judgment of the relative area obtained after the updating in Step S207 as the result of judgment of the relative area in Step S106. Specifically, if the result of judgment of the relative area in Step S106 is present, the relative position judgment section 22 determines the result of judgment of the relative area in Step S106 as the relative area. However, the method of determining the relative area is not limited to this. For example, the relative position judgment section 22 may observe the result of judgment of the relative area which does not use the second neighboring object 300 and the result of judgment of the relative area which uses the second neighboring object 300 for a fixed time period to adopt the result generated most frequently or may assign weights to the two results.

B-3. First Modification

The example in which the altitude difference judgment section 25 makes the judgment on different roads differing in altitude, based on whether the difference in altitude between points of the center of gravity of clusters exceeds the fixed threshold value or not is illustrated with reference to FIGS. 19 and 20. A fixed value may be set as the threshold value, based on Road Structure Ordinance which is a government ordinance that establishes the general technical standards of structures of roads. However, the threshold value need not be the fixed value, but may be a variable value based on the traveling speed of mobile objects, for example.

B-4. Second Modification

In Step S203 of FIG. 18, it is described that the altitude difference judgment section 25 performs the cluster analysis on the absolute values of the altitudes. However, the altitude difference judgment section 25 may perform the cluster analysis on the offset values of the altitudes with respect to the traveling histories.

B-5. Third Modification

In Step S206 of FIG. 18, it is described that the altitude difference judgment section 25 performs the correlation analysis on the absolute values of the altitudes. However, the altitude difference judgment section 25 may perform the correlation analysis on the offset values of the altitudes with respect to the traveling histories.

B-6. Fourth Modification

The example in which the driving assistance device 10B performs the processes of the first embodiment in Steps S101 to S106, and thereafter performs the process of making the judgment on different roads differing in altitude (Step S106A) is illustrated in FIG. 17. However, the driving assistance device 10B may skip the processes of the first embodiment to perform only the process of making the judgment on different roads differing in altitude. In other words, the processes in Step S102 to S106 need not be performed in the flow diagram of FIG. 17.

B-7. Fifth Modification

In FIG. 18, it is described that the altitude difference judgment section 25 performs the cluster analysis on the altitude information to thereby perform the process of making the judgment on different roads differing in altitude. However, the altitude difference judgment section 25 may perform the process of making the judgment on different roads differing in altitude in consideration of speed information in addition to the altitude information. Specifically, if there is a difference in speed between the clusters, the altitude difference judgment section 25 may judge that there is a great likelihood that the roads are different.

B-8. Effects

As described above, the driving assistance device 10B according to the second embodiment includes the altitude difference judgment section 25 for judging whether the object of interest 100 and the first neighboring object 200 travel on different road differing in altitude or not through the use of the altitude information included in the traveling histories of the plurality of second neighboring objects 300. Thus, the driving assistance device 10B is capable of accurately judging whether the object of interest 100 and the first neighboring object 200 travel on different road differing in altitude or not even if errors or variations are included in the altitude information.

Also, the altitude difference judgment section 25 performs the cluster analysis to classify the altitude information included in the traveling histories of the object of interest 100, the first neighboring object 200, and the plurality of second neighboring objects 300 into the first and second clusters. Then, if the difference between the values of the center of gravity of the first and second clusters is not less than the threshold value, the altitude difference judgment section 25 judges that the object of interest 100 and the first neighboring object 200 travel on different roads differing in altitude. In this manner, the driving assistance device 10B uses the values of the center of gravity of the clusters to accommodate errors or variations in altitude, thereby accurately making the judgment.

Also, the altitude difference judgment section 25 performs the correlation analysis on each of the first and second clusters. The altitude difference judgment section 25 assigns greater weights to the result of judgment that the object of interest 100 and the first neighboring object 200 travel on different roads differing in altitude, when the correlation values obtained by the correlation analysis for the first and second clusters are not less than the threshold value than when the correlation values are less than the threshold value. Thus, the driving assistance device 10B is capable of accurately judging whether the object of interest 100 and the first neighboring object 200 travel on different roads differing in altitude or not.

C. Third Embodiment

C-1. Configuration

Figure 21:
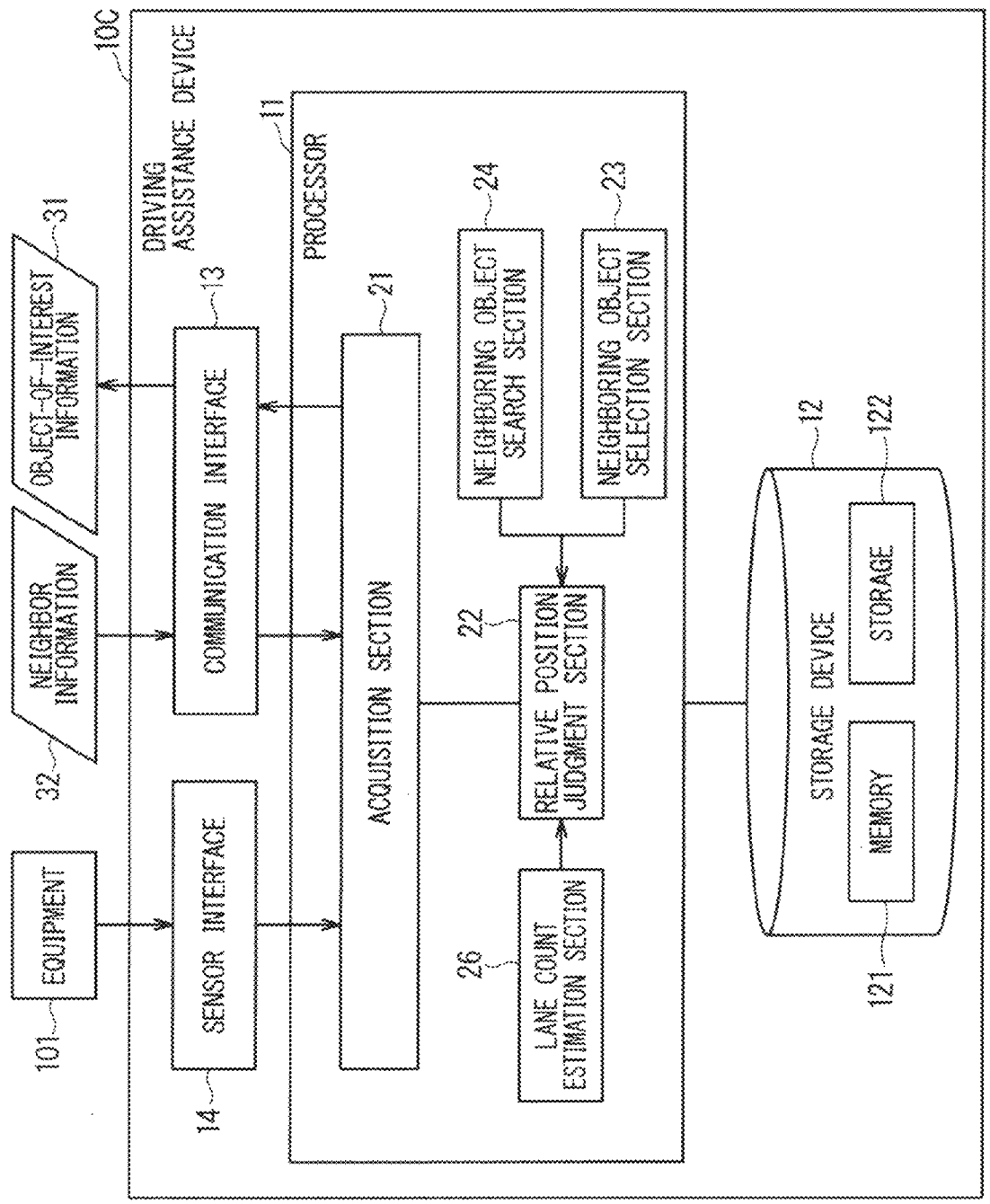
FIG. 21 is a diagram of the driving assistance device according to a third embodiment.

FIG. 21 shows a configuration of a driving assistance device 10C according to a third embodiment. The driving assistance device 10C further includes a lane count estimation section 26 in addition to the components of the driving assistance device 10A of the first embodiment. The driving assistance device 10C differs from the first embodiment in estimating the number of lanes (or a lane count) to judge whether the object of interest 100 is present at a position where right and left turns are permitted or not with the use of the relative areas of a plurality of second neighboring objects 300 with the object of interest 100 taken as the starting point. This difference will be described in the third embodiment, and parts identical with those of the first embodiment will not be described.

C-2. Operation

FIG. 22 is a table showing the number of lanes in the road on which the object of interest 100 travels and results of judgment of the likelihood of right and left turns. The first column in the table of FIG. 22 designates the relative areas of the second neighboring object 300 relative to the object of interest 100. The second column designates results of estimation of the number of lanes in the road on which the object of interest 100 travels by means of the lane count estimation section 26. The third column designates the likelihood that the object of interest 100 is not permitted to turn to the left by means of the lane count estimation section 26 as a "No Left Turn flag". In the third column, the triangle "Δ" denotes that there is a small likelihood that the left turn is not permitted; the open circle "○" denotes that there is a great likelihood that the left turn is not permitted; and the minus sign "–" denotes that the likelihood that the left turn is not permitted cannot be judged. The fourth column designates the likelihood that the object of interest 100 is not permitted to turn to the right by means of the lane count estimation section 26 as a "No Right Turn flag". The No Right Turn flag is denoted in the same manner as the No Left Turn flag.

In the example of FIG. 22, if the relative area of the second neighboring object 300 relative to the object of interest 100 is Ahead Right or Behind Right, the lane count estimation section 26 judges that a right lane is present with respect to the lane in which the object of interest 100 travels, and estimates that the number of lanes in the traveling road is two or more. Because of the presence of a lane to the right of the lane in which the object of interest 100 travels, the lane count estimation section 26 judges that there is a small likelihood that the right turn is not permitted, but cannot judge the likelihood that the left turn is not permitted.

If the relative area of the second neighboring object 300 relative to the object of interest 100 is Ahead Far Left or Behind Far Left, the lane count estimation section 26 judges that two left lanes are present with respect to the lane in which the object of interest 100 travels. The lane count estimation section 26 accordingly estimates that the number of lanes in the road on which the object of interest 100 travels is three or more. Because of the presence of two lanes to the left of the lane in which the object of interest 100 travels, the lane count estimation section 26 judges that there is a great likelihood that the left turn is not permitted, but cannot judge the likelihood that the right turn is not permitted.

If the relative area of the second neighboring object 300 relative to the object of interest 100 is either Ahead Far Right or Behind Far Right and either Ahead Far Left or Behind Far Left, the lane count estimation section 26 judges that two right lanes and two left lanes are present with respect to the lane in which the object of interest 100 travels. The lane count estimation section 26 accordingly estimates that the number of lanes in the road on which the object of interest 100 travels is five or more. Because of the presence of two lanes to the left of the lane in which the object of interest 100 travels, the lane count estimation section 26 judges that there is a great likelihood that the left turn is not permitted. Also, because of the presence of two lanes to the right of the lane in which the object of interest 100 travels, the lane count estimation section 26 judges that there is a great likelihood that the right turn is not permitted.

It is described above that the lane count estimation section 26 judges the number of lanes and the likelihood that right and left turns are not permitted in accordance with the relative area of the second neighboring object 300 relative to the object of interest 100. However, the lane count estimation section 26 may estimate the occurrence of right and left turns, based on the traveling history of the second neighboring object 300, to judge the likelihood of the right and left turns. Also, the lane count estimation section 26 may use not only the relative area between the object of interest 100 and the second neighboring object 300 but also the relative area between the object of interest 100 and the first neighboring object 200 to judge the likelihood that right and left turns are not permitted.

C-3. Effects

As described above, the driving assistance device 10C according to the third embodiment includes the lane count estimation section 26 for judging the number of lanes in the road on which the object of interest travels and the likelihood that the object of interest 100 is permitted to turn to the right and to the left, based on the relative area of the second neighboring object 300 with the object of interest 100 taken as the starting point. Thus, when providing the driving assistance to the object of interest 100, the driving assistance device 10C is capable of grasping the likelihoods of lane changes and right and left turns to thereby suppress erroneous driving assistance.

The embodiments according to the present invention may be freely combined within the scope of the invention or the embodiments may be changed and dispensed with, as appropriate. While the invention has been described in detail, the foregoing description is in all aspects illustrative and not restrictive. It is understood that numerous other modifications and variations can be devised without departing from the scope of the invention.

EXPLANATION OF REFERENCE SIGNS 10A, 10B, 10C Driving assistance devices
11 Processor
12 Storage device
13 Communication interface
14 Sensor interface
21 Acquisition section
22 Relative position judgment section
23 Neighboring object selection section
24 Neighboring object search section
25 Altitude difference judgment section
26 Lane count estimation section
31 Object-of-interest information
32 Neighbor information
40 Relative areas
100 Object of interest
101 Equipment
121 Memory
122 Storage
200 First neighboring object
300 Second neighboring objects

The invention claimed is:

1. A driving assistance device, comprising:
a processor to execute a program; and
a memory to store the program which, when executed by the processor, performs processes of,
acquiring object-of-interest information indicating a traveling history of an object of interest that is a mobile object, and neighbor information indicating a traveling history of a neighboring object that is a mobile object traveling around the object of interest,
the neighboring object including
a first neighboring object that is a mobile object for judgment of a relative positional relationship relative to the object of interest by the driving assistance device, and
at least one second neighboring object the traveling history of which partially overlaps the traveling history of at least one of the object of interest and the first neighboring object,
judging a relative positional relationship of the object of interest and the first neighboring object relative to the second neighboring object, based on the object-of-interest information and the neighbor information, to make a judgment as a first judgment on a relative positional relationship between the object of interest and the first neighboring object, based on the aforementioned judgment result, and
providing information to a driver or controlling the object of interest in accordance with the first judgment.

2. The driving assistance device according to claim 1, wherein
the first judgement is made by calculating relative coordinates of the object of interest and the first neighboring object, with the second neighboring object, taken as an origin point, based on the object-of-interest information and the neighbor information, to calculate relative coordinates of the first neighboring object, with the object of interest taken as an origin point, based on the aforementioned calculation result.

3. The driving assistance device according to claim 1, wherein
the first judgement is made by calculating relative areas of the object of interest and the first neighboring object, with the second neighboring object taken as a starting point, and relative distances between the second neighboring object and the object of interest and between the second neighboring object and the first neighboring object, based on the Object-of-interest information and the neighbor information, to make a judgment on a relative area of the first neighboring object, with the object of interest taken as a starting point, based on the aforementioned calculation result.

4. The driving assistance device according to claim 1, wherein
the first judgement is made if it is judged that the use of the neighbor information about the second neighboring object is necessary, based on a relationship between a road on which the object of interest travels and a road on which the first neighboring object travels and a relative distance between the object of interest and the first neighboring object.

5. The driving assistance device according to claim 1, wherein
the first judgement is made if the traveling history of the object of interest does not even partially overlap the traveling history of the first neighboring object.

6. The driving assistance device according to claim 1, wherein
when executed by the processor, the program further performs processes of,
making a judgment as a second judgment on a relative positional relationship between the object of interest and the first neighboring object, based on the object-of-interest information and the neighbor information about the first neighboring object, as well as the first judgment, to assign greater weights to the result of the first judgment and assign smaller weights to the result of the second judgment when the traveling histories of the object of interest and the first neighboring object do not even partially overlap each other than when the traveling histories overlap each other.

7. The driving assistance device according to claim 1, wherein
when executed by the processor, the program further performs processes of,
selecting one second neighboring object from among the plurality of second neighboring objects, based on the length of a region in which the traveling history thereof partially overlaps the traveling history of the object of interest or the first neighboring object,
wherein in the first judgement, a judgement is made on a relative positional relationship between the object of interest and the first neighboring object, based on a relative positional relationship between the second neighboring object which is selected and the object of interest and a relative positional relationship between the second neighboring object which is selected and the first neighboring object.

8. The driving assistance device according to claim 1, wherein when executed by the processor, the program further performs processes of, judging an altitude difference judgement whether the object of interest and the first neighboring object travel on different roads differing in altitude or not with the use of altitude information included in the traveling histories of the plurality of second neighboring objects.

9. The driving assistance device according to claim 8, wherein in the altitude difference judgment, altitude information included in the traveling histories of the object of interest, the first neighboring object, and the plurality of second neighboring objects is classified into a first cluster and a second cluster by a cluster analysis to judge that the object of interest and the first neighboring object travel on different roads differing in altitude if a difference between the value of the center of gravity of the first cluster and the value of the center of gravity of the second cluster is not less than a threshold value.

10. The driving assistance device according to claim 9, wherein in the altitude difference judgment, a correlation analysis is performed on each of the first and second clusters to assign greater weights to the result of judgment that the object of interest and the first neighboring object travel on different roads differing in altitude when correlation values obtained by the correlation analysis for the first and second clusters are not less than a threshold value than when the correlation values are less than the threshold value.

11. The driving assistance device according to claim 1 wherein when executed by the processor, the program further performs processes of, judging the number of lanes in the road on which the object of interest travels and a likelihood that the object of interest is permitted to turn to the right and to the left, based on a relative area of the second neighboring object, with the object of interest taken as a starting point.

12. A driving assistance method comprising:

acquiring object-of-interest information indicating a traveling history of an object of interest that is a mobile object, and neighbor information indicating a traveling history of a neighboring object that is a mobile object traveling around the object of interest, wherein the neighboring object includes a first neighboring object that is a mobile object for judgment of a relative positional relationship relative to the object of interest by the driving assistance device, and a second neighboring object the traveling history of which partially overlaps the traveling history of at least one of the object of interest and the first neighboring object, the driving assistance method further comprising judging a relative positional relationship of the object of interest and the first neighboring object relative to the second neighboring object, based on the object-of-interest information and the neighbor information, to make a judgment as a first judgment on a relative positional relationship between the object of interest and the first neighboring object, based on the aforementioned judgment result, and providing information to a driver or controlling the object of interest in accordance with the first judgment.

\* \* \* \* \*